US010286941B2

(12) United States Patent
Li et al.

(10) Patent No.: US 10,286,941 B2
(45) Date of Patent: May 14, 2019

(54) INFANT STROLLER APPARATUS

(71) Applicant: Wonderland Nurserygoods Company Limited, Tuen Mun, N.T. (HK)

(72) Inventors: Jian Qun Li, Tuen Mun (CN); Zheng Wen Guo, Tuen Mun (CN); Er Xue Wang, Tuen Mun (CN)

(73) Assignee: WONDERLAND NURSERYGOODS COMPANY LIMITED, Tuen Mun, N.T. (HK)

( * ) Notice: Subject to any disclaimer, the term of this patent is extended or adjusted under 35 U.S.C. 154(b) by 0 days.

(21) Appl. No.: 15/709,797

(22) Filed: Sep. 20, 2017

(65) Prior Publication Data

US 2018/0001920 A1 Jan. 4, 2018

Related U.S. Application Data

(63) Continuation of application No. 15/334,357, filed on Oct. 26, 2016, now Pat. No. 9,796,405.

(30) Foreign Application Priority Data

Nov. 23, 2015 (CN) .......................... 2015 1 0819550
Mar. 23, 2016 (CN) .......................... 2016 1 0171473

(51) Int. Cl.
*B62B 3/00* (2006.01)
*B62B 7/06* (2006.01)

(52) U.S. Cl.
CPC .......... *B62B 7/062* (2013.01); *B62B 2205/20* (2013.01); *B62B 2501/06* (2013.01)

(58) Field of Classification Search
CPC .. B62B 7/062; B62B 7/06; B62B 7/08; B62B 7/083; B62B 7/086; B62B 9/00;
(Continued)

(56) References Cited

U.S. PATENT DOCUMENTS 5,056,805 A 10/1991 Wang
5,535,483 A 7/1996 Cabagnero
(Continued)

FOREIGN PATENT DOCUMENTS

CN 201371841 Y 12/2009
CN 101844575 A 9/2010
(Continued)

OTHER PUBLICATIONS

The Office Action dated Aug. 22, 2018 in co-pending Japanese Patent Application No. 2017-178990 with English translation.
(Continued)

*Primary Examiner* — James M Dolak
(74) *Attorney, Agent, or Firm* — Baker & McKenzie LLP

(57) ABSTRACT

An infant stroller apparatus includes a front leg frame, a rear leg frame and a handle frame. The front leg frame has a first side portion fixedly connected with a first stop abutment. The rear leg frame has a second side portion having a protrusion. The handle frame has a side segment fixedly connected with a second stop abutment, the first and second side portions and the side segment being pivotally connected with one another about a common first pivot axis. The protrusion is restrictedly positioned between the first and second stop abutments when the infant stroller apparatus is in a deployed state.

16 Claims, 21 Drawing Sheets

(58) Field of Classification Search
CPC ........... B62B 9/10; B62B 9/102; B62B 9/104;
B62B 2205/00; B62B 2205/20; B62B
2205/18; B62B 2205/003
See application file for complete search history.

(56) References Cited

U.S. PATENT DOCUMENTS

| | | | |
|---|---|---|---|
| 5,725,238 A * | 3/1998 | Huang | B62B 7/08 |
| | | | 280/302 |
| 6,045,145 A * | 4/2000 | Lan | B62B 9/28 |
| | | | 280/47.35 |
| 6,298,949 B1 | 10/2001 | Yang et al. | |
| 6,550,801 B1 | 4/2003 | Newhard | |
| 6,676,140 B1 | 1/2004 | Gondobintoro | |
| 6,678,140 B2 | 1/2004 | Jakwani et al. | |
| 7,118,121 B2 * | 10/2006 | Cheng | B62B 7/08 |
| | | | 280/642 |
| 7,278,652 B2 | 10/2007 | Riedl et al. | |
| 7,905,509 B2 * | 3/2011 | Yeh | B62B 9/087 |
| | | | 280/47.36 |
| 8,070,180 B2 | 12/2011 | Stiba | |
| 8,282,120 B2 * | 10/2012 | Minato | B62B 7/062 |
| | | | 280/47.38 |
| 8,485,547 B2 * | 7/2013 | Hsu | B62B 7/062 |
| | | | 280/642 |
| 8,602,442 B2 * | 12/2013 | Li | B62B 7/062 |
| | | | 280/642 |
| 8,657,311 B2 * | 2/2014 | Li | B62B 9/203 |
| | | | 280/47.39 |
| 8,870,214 B2 * | 10/2014 | Kane | B62B 7/062 |
| | | | 280/647 |
| 8,905,427 B2 | 12/2014 | Katz et al. | |
| 8,936,267 B2 * | 1/2015 | Li | B62B 7/08 |
| | | | 280/30 |
| 8,944,457 B2 | 2/2015 | Rembisz et al. | |
| 9,085,312 B2 | 7/2015 | Liu | |
| 9,193,373 B2 | 11/2015 | Fjelland et al. | |
| 9,505,423 B2 | 11/2016 | Thorne et al. | |
| 9,517,786 B2 | 12/2016 | Chang et al. | |
| 9,545,940 B2 | 1/2017 | Taylor et al. | |
| 9,580,098 B2 | 2/2017 | Eisinger | |
| 9,630,642 B2 * | 4/2017 | Zehfuss | B62B 9/104 |
| 9,796,405 B2 * | 10/2017 | Li | B62B 7/062 |
| 9,862,400 B2 * | 1/2018 | Valdez | B62B 7/062 |
| 9,981,678 B1 * | 5/2018 | Chen | B62B 7/068 |
| 10,023,217 B2 * | 7/2018 | Sack | B62B 7/062 |
| 10,053,130 B1 | 8/2018 | McNamara | B62B 7/086 |
| 10,065,669 B2 * | 9/2018 | Mattarocci | B62B 9/104 |
| 10,145,159 B2 * | 12/2018 | Sukeforth | E05D 11/1007 |
| 10,155,528 B2 * | 12/2018 | Zhong | B62B 7/083 |
| 2004/0222616 A1 | 11/2004 | Valdez et al. | |
| 2005/0098983 A1 * | 5/2005 | Cheng | B62B 7/08 |
| | | | 280/642 |
| 2006/0255564 A1 | 11/2006 | Ayre | |
| 2007/0284855 A1 | 12/2007 | Lin | |
| 2008/0079240 A1 * | 4/2008 | Yeh | B62B 7/08 |
| | | | 280/642 |
| 2009/0289431 A1 | 11/2009 | Geeslin | |
| 2013/0147162 A1 | 6/2013 | Hsu | |
| 2014/0346756 A1 | 11/2014 | Laffan et al. | |
| 2015/0232114 A1 | 8/2015 | Gillett | |

FOREIGN PATENT DOCUMENTS

| | | |
|---|---|---|
| CN | 201626469 U | 11/2010 |
| CN | 201800747 U | 4/2011 |
| CN | 101898574 B | 2/2012 |
| CN | 101758847 B | 7/2012 |
| CN | 202400130 U | 8/2012 |
| CN | 103072612 A | 5/2013 |
| CN | 103318242 A | 9/2013 |
| CN | 101837800 B | 12/2014 |
| CN | 104843046 A | 8/2015 |
| CN | 104908794 A | 9/2015 |
| CN | 204688180 U | 10/2015 |
| CN | 106347444 A | 1/2017 |
| EP | 2164745 B1 | 8/2013 |
| GB | 2478622 A | 9/2011 |
| JP | 9277938 A | 10/1997 |
| JP | 3174293 | 2/2012 |
| JP | 3174293 U | 2/2012 |
| WO | 2005108181 A2 | 11/2005 |
| WO | 2009041875 A1 | 4/2009 |
| WO | 2011095129 A1 | 8/2011 |

OTHER PUBLICATIONS

Office Action co-pending JP Patent Application No. 2016-209464 dated Jun. 2017.
Combined Search and Examination Report in copending GB Application No. 1618057.2 dated Apr. 20, 2017.
Office Action (Search Report) from copending Divisional UK Application 1721632.6 dated Jun. 25, 2018.
U.S. Appl. No. 15/334,357 by Li et al. filed Oct. 26, 2016 entitled "Infant Stroller Apparatus"incorporated herein by reference. A copy of the application is available to the Examiner on the USPTO database and has not been filed herewith.
Office Action from copending CN Patent Application No. 201610171473.7 dated Aug. 3, 2018.
Office Action from copending JP Application No. 2017178990 dated Aug. 22, 2018.

* cited by examiner

INFANT STROLLER APPARATUS

CROSS-REFERENCE TO RELATED APPLICATION(S)

This Patent Application is a Continuation of U.S. patent application Ser. No. 15/334,357 filed on Oct. 26, 2016, which respectively claims priority to China Patent Application No. 201510819550.0 filed on Nov. 23, 2015, and to China Patent Application No. 201610171473.7 filed on Mar. 23, 2016, which are incorporated herein by reference.

BACKGROUND

1. Field of the Invention

The present invention relates to infant stroller apparatuses.

2. Description of the Related Art

Infant strollers can be used to conveniently transport babies and children for outdoor activities. When it is unused, the infant stroller generally can be collapsed to a compact form for convenient storage or transport.

Some existing infant strollers have a stroller frame on which a seat can be detachably installed. For collapsing the infant stroller, certain construction may require to detach the seat before the stroller frame is folded, which may be more cumbersome and need additional storage space for the seat. Some other construction may have a seat assembly that allows collapse of the stroller frame with the seat mounted thereon. However, the collapsed infant stroller with the seat thereon may have a size that is still not as small as desired.

Therefore, there is a need for an improved infant stroller that can be conveniently collapsed to a compact form, and can address at least the foregoing issues.

SUMMARY

The present application describes an infant stroller apparatus that can be conveniently collapsed to a compact form. In some embodiment, the infant stroller apparatus includes a front leg frame, a rear leg frame and a handle frame. The front leg frame has a first side portion fixedly connected with a first stop abutment. The rear leg frame has a second side portion having a protrusion. The handle frame has a side segment fixedly connected with a second stop abutment, the first and second side portions and the side segment being pivotally connected with one another about a common first pivot axis. The protrusion is restrictedly positioned between the first and second stop abutments when the infant stroller apparatus is in a deployed state.

DETAILED DESCRIPTION OF THE EMBODIMENTS

Figure 1:
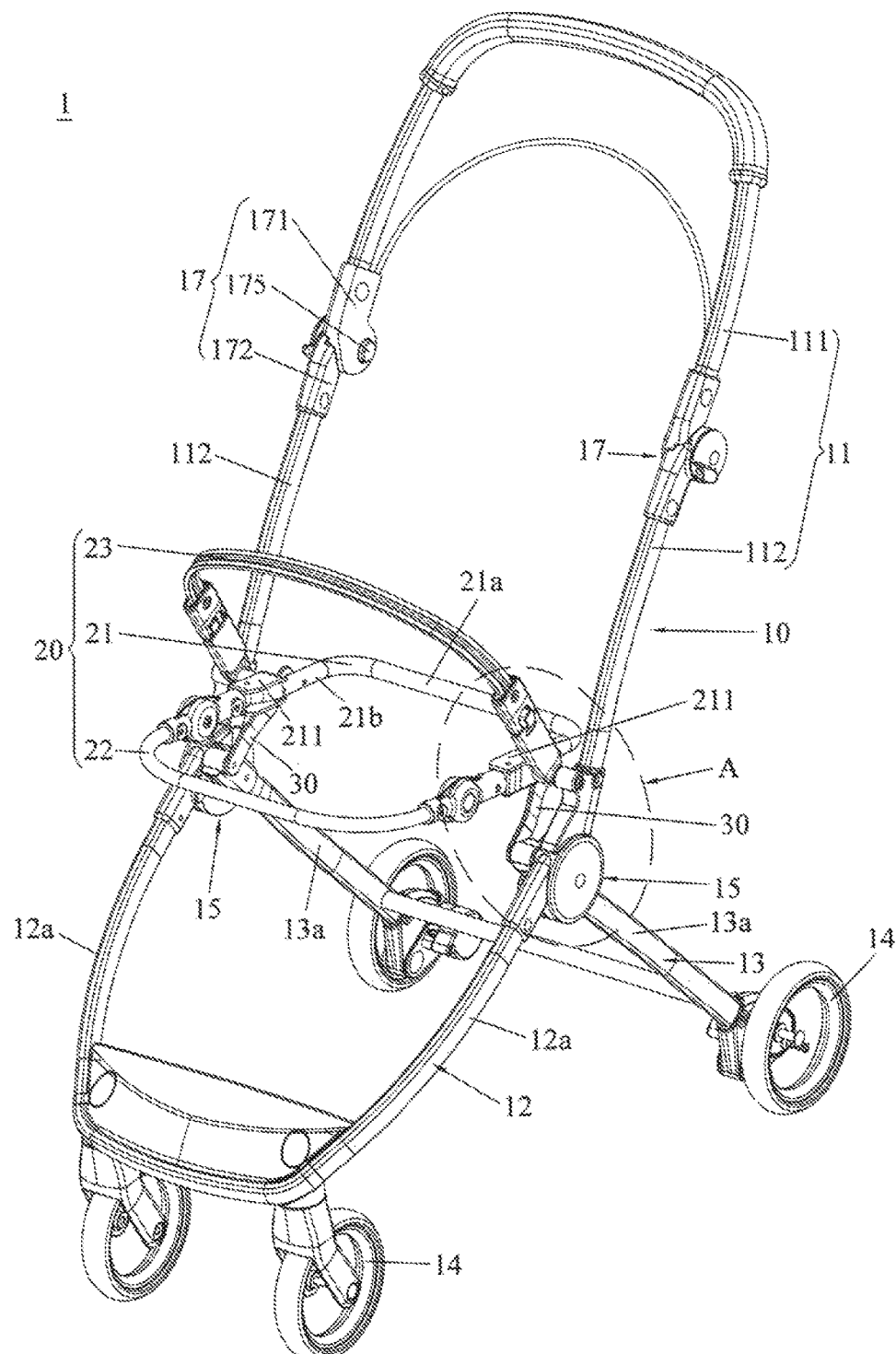
FIG. 1 is a perspective view illustrating an embodiment of an infant stroller apparatus.
Figure 2:
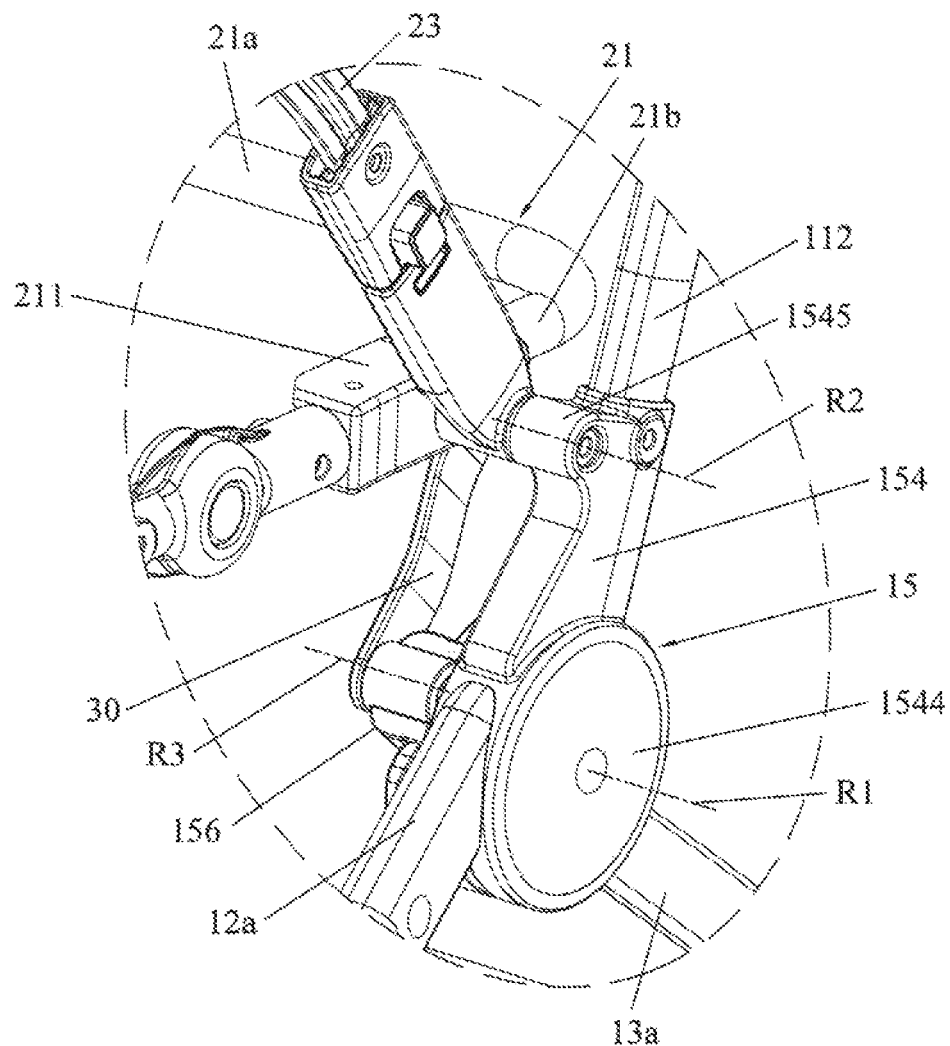
FIG. 2 is an enlarged view of portion A shown in FIG. 1.

FIGS. 1-5 are schematic views illustrating an embodiment of an infant stroller apparatus 1. The infant stroller apparatus 1 includes a stroller frame 10 and a seat frame 20 that are assembled with each other and have a foldable structure. The construction of the infant stroller apparatus 1 at the left and right side can be substantially symmetric. The stroller frame 10 can include a handle frame 11, a front leg frame 12 and a rear leg frame 13. Each of the front leg frame 12 and the rear leg frame 13 can respectively have two side portions (side portions 12a for the front leg frame 12, and side portions 13a for the rear leg frame 13) at the left and right side of the stroller frame 10. The two side portions 12a of the front leg frame 12 can have upper ends respectively connected pivotally with two lower ends of the handle frame 11 via two pivot joints 15, and the two side portions 13a of the rear leg frame 13 can have upper ends respectively connected pivotally with the two pivot joints 15. The handle frame 11, the front leg frame 12 and the rear leg frame 13 are thereby pivotally connected with one another about a same pivot axis R1 via the two pivot joints 15. Moreover, each of the front leg frame 12 and the rear leg frame 13 can be downwardly assembled with a plurality of wheels 14 for facilitating displacement of the stroller apparatus 1 on a ground.

Figure 3:
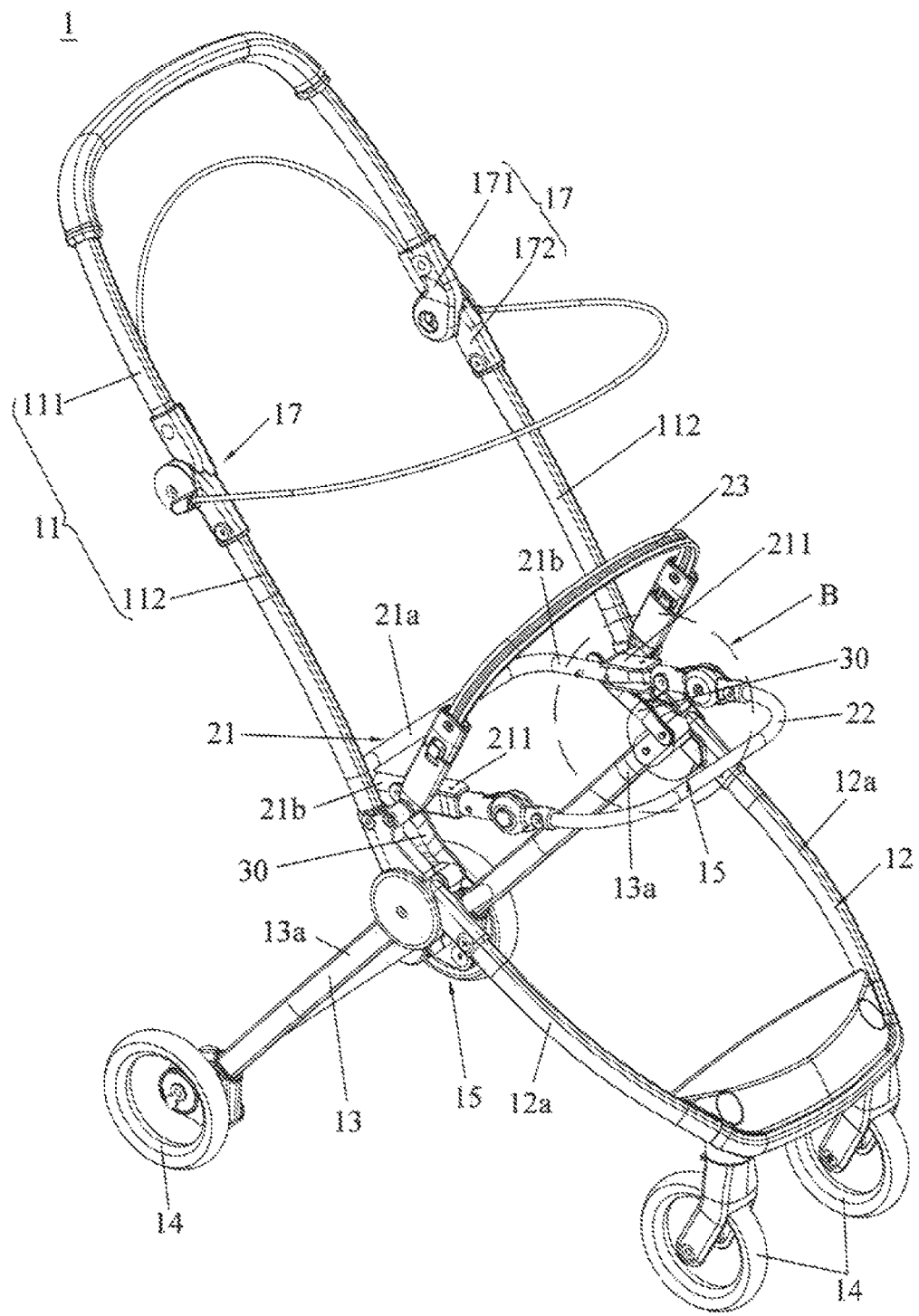
FIG. 3 is another perspective view of the infant stroller apparatus.

Referring to FIGS. 1 and 3, the handle frame 11 can include a push handle 111 and two side segments 112. The push handle 111 can have a generally U-shape, and is pivotally connected with the two side segments 112 at a left and a right side. More specifically, the two side segments 112 can have upper ends respectively connected pivotally with the push handle 111 via two pivot joints 17, and lower ends respectively connected pivotally with the two side portions 12a of the front leg frame 12 via the two pivot joints 15. The two pivot joints 17 can define a pivot axis extending generally transversally relative to the stroller frame 10 and parallel to the pivot axis R1 of the two pivot joints 15. The push handle 111 can thereby rotate about the pivot joints 17 relative to the two side segments 112 between an unfolded state and a folded state. In the unfolded state, the push handle 111 extends generally upward from the two pivot joints 17 and above the two side segments 112. In the folded state, the push handle 111 is rotated to a lower position extending downward from the two pivot joints 17 and generally parallel to the two side segments 112 (better shown in FIG. 10), which can reduce the size of the folded stroller frame 10.

Referring again to FIGS. 1-5, the seat frame 20 can include two frame portions 21 and 22 pivotally connected with each other, the frame portion 21 extending at a rear of the seat frame 20, and the frame portion 22 extending at a front of the seat frame 20. Each of the frame portions 21 and 22 can have a generally U-shape. The frame portion 21 can include a rear transversal portion 21a, and two side portions 21b respectively extending along a left and a right side of the seat frame 20. The frame portion 21 extends between the two side segments 112, and the two side portions 21b thereof are respectively connected pivotally with the two side segments 112 of the handle frame 11 about a pivot axis R2. For example, the two side portions 21b of the frame portion 21 can be respectively attached with two brackets 211, which are respectively connected pivotally with the two side segments 112 of the handle frame 11 about the pivot axis R2. In addition, a guard member 23 extending above the seat frame 20 may be connected pivotally with the two side portions 21b of the frame portion 21, e.g., about the same pivot axis R2. The frame portion 22 at the front of the seat frame 20 may be pivotally adjusted relative to the frame portion 21 to an inclined position for providing suitable support for the legs of a child sitting on the seat frame 20.

Two bar linkages 30 respectively disposed at a left and a right side are respectively connected pivotally with the stroller frame 10 and the seat frame 20 so as to couple folding and unfolding movements of the stroller frame 10 and the seat frame 20. As better shown in FIG. 4, each bar linkage 30 can be an elongated bar having one end 30a connected pivotally with one side portion 13a of the rear leg frame 13 about a pivot axis R3, and one opposite end 30b pivotally connected with the side portion 21b of the seat frame 20 about a pivot axis R4. The end 30a of the bar linkage 30 may be pivotally connected with the side portion 13a of the rear leg frame 13 at a location above the pivot axis R1, and the other end 30b of the bar linkage 30 may be connected with the side portion 21b of the frame portion 21 behind the bracket 211. For folding the stroller frame 10, the handle frame 11 can be rotated downward about the pivot joints 15, which drives the frame portion 21 in rotation. Owing to the coupling of the two bar linkages 30, the rotating frame portion 21 can drive the rear leg frame 13 to rotate toward the front leg frame 12 for collapsing the stroller frame 10.

Referring to FIGS. 1-4, when the infant stroller apparatus 1 is in the deployed state, the pivot axes R2, R3 and R4 are all located above the pivot axis R1, and the seat frame 20 extends generally horizontally. More specifically, the pivot axis R2 is located in front of the fourth pivot axis R4 and above and behind the pivot axis R1, the pivot axis R3 is above and in front of the pivot axis R1, and the pivot axis R4 is above and behind the pivot axis R1. This frame assembly can provide effective support for the seat frame 20 in the deployed state, and convenient collapse of the seat frame 20.

Figure 4:
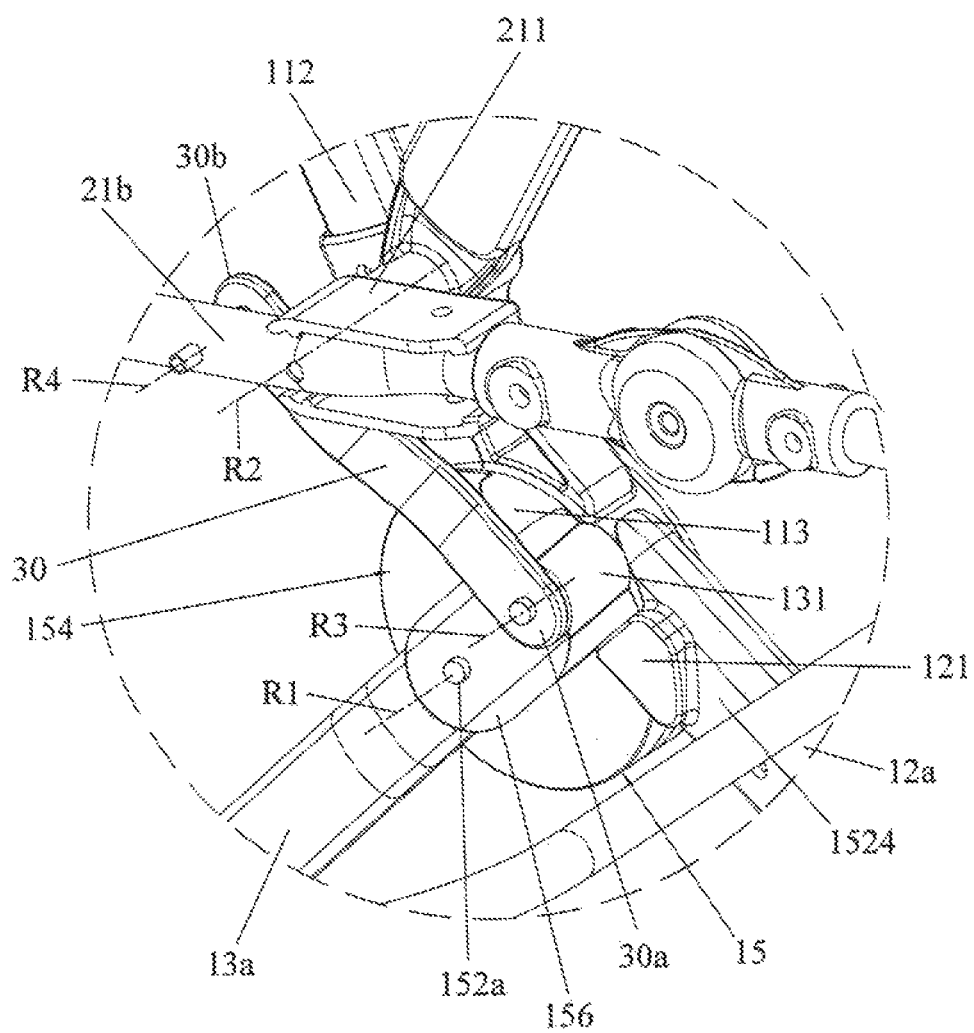
FIG. 4 is an enlarged view of portion B shown in FIG. 3.
Figure 5:
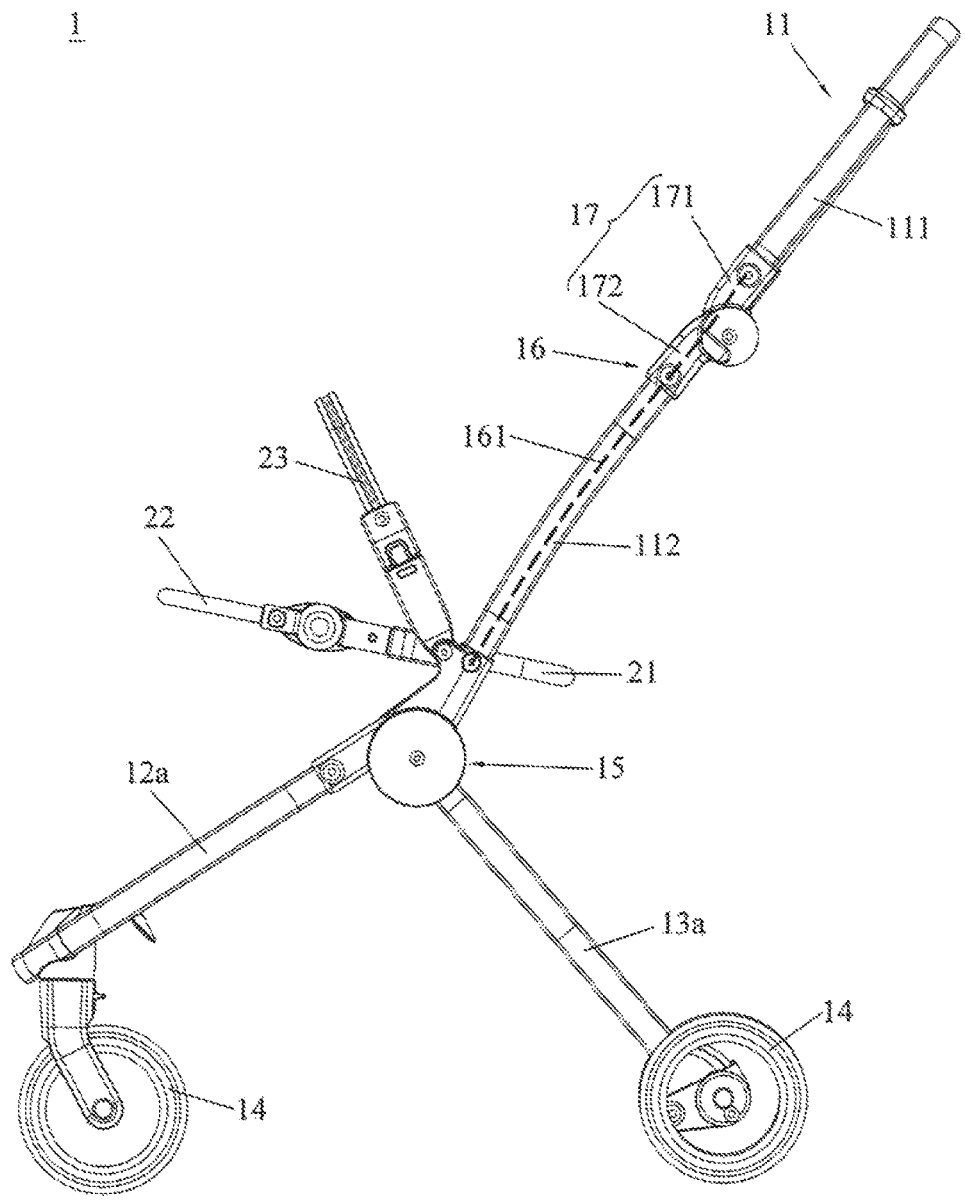
FIG. 5 is a side view of the infant stroller apparatus.

As better shown in FIG. 4, the side segment 112 of the handle frame 11 can be fixedly connected with a stop abutment 113, and the side portion 12a of the front leg frame 12 can be fixedly connected with another stop abutment 121 spaced apart from the stop abutment 113. The stop abutments 113 and 121 can be respectively disposed at positions near the pivot joint 15. While the stroller frame 10 is in the deployed state, a protrusion 131 fixedly connected with the side portion 13a can be restrictedly positioned between the stop abutments 113 and 121, which can prevent rotation of the rear leg frame 13 relative to the handle frame 11 and the front leg frame 12. When the handle frame 11 is rotated in a collapsing direction toward the front leg frame 12, the stop abutment 113 of the handle frame 11 can travel away from the stop abutment 121 of the front leg frame 12 and the protrusion 131 of the side portion 13a, thereby allowing rotation of the rear leg frame 13.

Referring to FIGS. 3 and 4, at each of the left and right side of the stroller frame 10, the side segment 112 of the handle frame 11, the side portion 12a of the front leg frame 12 and the side portion 13a of the rear leg frame 13 are connected with one another about the same pivot axis R1 via the pivot joint 15. Each pivot joint 15 can include a latch mechanism operable to lock the stroller frame 10 in a deployed state and to unlock for folding or collapsing the stroller frame 10. Moreover, the stroller frame 10 can further include a release mechanism 16 that is assembled with the handle frame 11 and is respectively connected with the latch mechanism in each pivot joint 15. The release mechanism 16 is operable to unlock the two pivot joints 15 for allowing collapse of the stroller frame 10.

The two pivot joints 15 provided at the left and right sides of the stroller frame 10 can have a same construction. Referring to FIGS. 4 and 6-8, each pivot joint 15 can include a latch 151, three coupling members 152, 154 and 156, and a spring 153. The coupling member 152 is fixedly fastened to the side portion 12a of the front leg frame 12, the coupling member 154 is fixedly fastened to the side segment 112 of the handle frame 11, and the coupling member 156 is fixedly fastened to the side portion 13a of the rear leg frame 13. The coupling members 152, 154 and 156 may be pivotally connected with one another via a shaft portion 152a, which thereby rotationally connects the handle frame 11, the front leg frame 12 and the rear leg frame 13 about the pivot axis R1.

In one embodiment, the coupling member 152 can include a plate 1522 having a generally round shape, and a stem 1523 projecting from the plate 1522. The coupling member 152 including the plate 1522 and the stem 1523 may be formed integrally as a single body. Examples of suitable materials for making the coupling member 152 can include, without limitation, metallic alloys (e.g., steel) and rigid plastics. A locking groove 1521 can be formed on a peripheral edge of the plate 1522. The stem 1523 can be fixedly fastened inside the side portion 12a of the front leg frame 12. Moreover, the stop abutment 121 may be fixedly provided on an inner side of a sleeve portion 1524, which is fixedly fastened with the side portion 12a of the front leg frame 12.

The coupling member 154 can include a receptacle 1541 and a sleeve portion 1542 fixedly joined with each other. The side segment 112 of the handle frame 11 can be inserted in the sleeve portion 1542 and fixedly fastened thereto. The sleeve 1542 can have a protruding mount portion 1545 where the side portion 21b of the seat frame 20 is pivotally connected with the side segment 112 about the pivot axis R2. The stop abutment 113 of the side segment 112 of the handle frame 11 can be fixedly connected with the coupling member 154 at an inner side thereof. When the coupling members 152 and 154 are assembled with each other, the plate 1522 can be received in the receptacle 1541 and pivotally connected therewith via the shaft portion 152a, and the stem 1523 can extend outside the receptacle 1541 through a slit 1543 provided on a sidewall of the receptacle 1541. A lid 1544 can cover a first side of the receptacle 1541 to conceal the plate 1522 therein.

The coupling member 156 (better shown in FIG. 4) can exemplary include a sleeve portion through which is inserted and fixedly fastened the upper end of the side portion 13a of the rear leg frame 13. The coupling member 156 is pivotally connected about the pivot axis R1 on a second side of the receptacle 1541 opposite to the side of the lid 1544 via the shaft portion 152a. Moreover, the pivot connection between the bar linkage 30 and the side portion 13a of the rear leg frame 13 can be achieved by having the end 30a of the bar linkage 30 pivotally connected with the coupling member 156. The protrusion 131 may be fixedly provided on the coupling member 156 at a location above the pivot axis R1.

The latch 151 is slidably assembled inside the side segment 112 of the handle frame 11, and can be guided for sliding movement into an interior of the coupling member 154, in particular into the receptacle 1541 of the coupling member 154. The latch 151 can engage with the locking groove 1521 of the plate 1522 to lock the handle frame 11 and the front leg frame 12 in the deployed state, and disengage from the locking groove 1521 to allow rotation of the handle frame 11 about the pivot joint 15 relative to the front leg frame 12 between the deployed and collapsed state. The spring 153 can have two opposite ends respectively connected with a knob 1511 provided on the latch 151 and a pin 112a fixedly anchored with the side segment 112 of the handle frame 11. The spring 153 biases the latch 151 for engaging with the locking groove 1521 of the coupling member 152.

Figure 6:
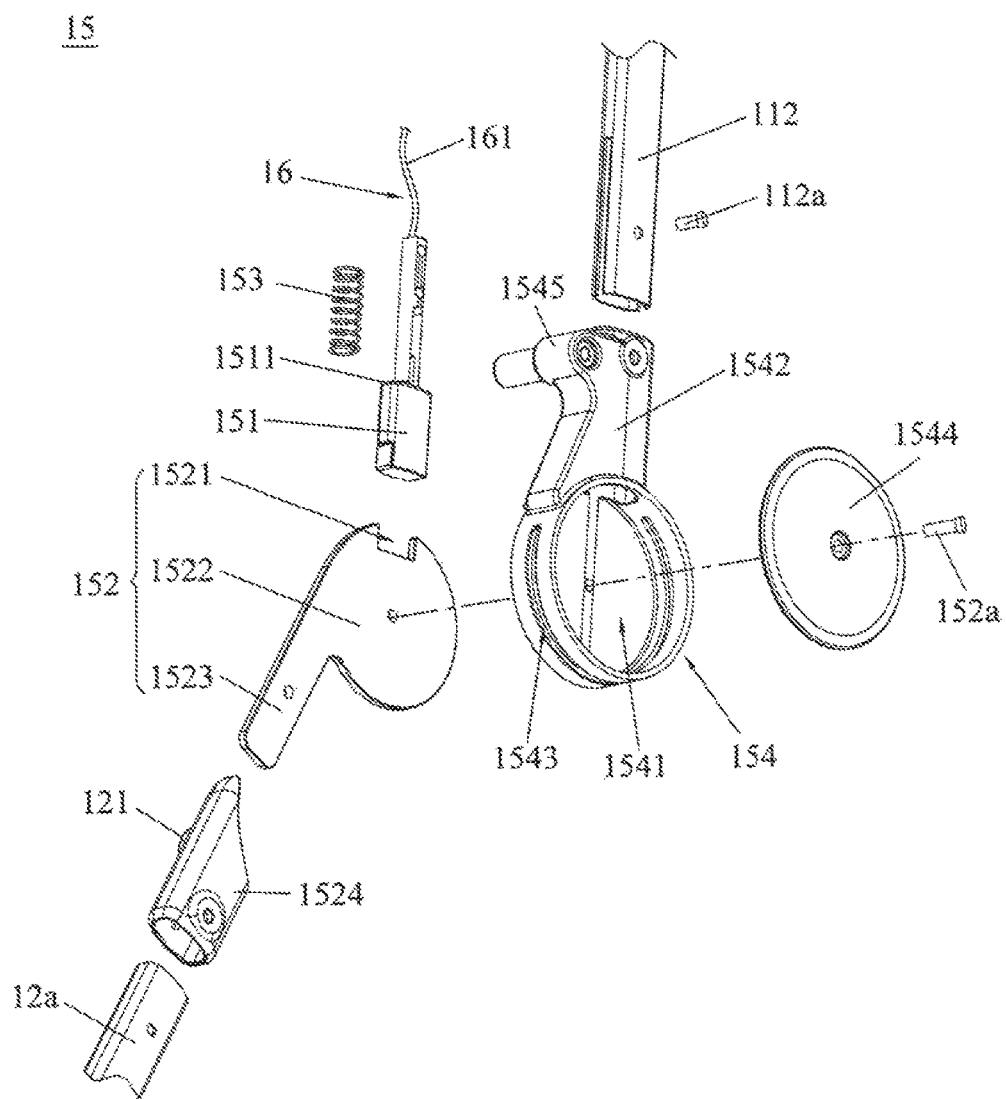
FIG. 6 is an exploded view illustrating the construction of a pivot joint that pivotally connects a handle frame with a front and a rear leg frame in the infant stroller apparatus shown in FIG. 1.
Figure 7:
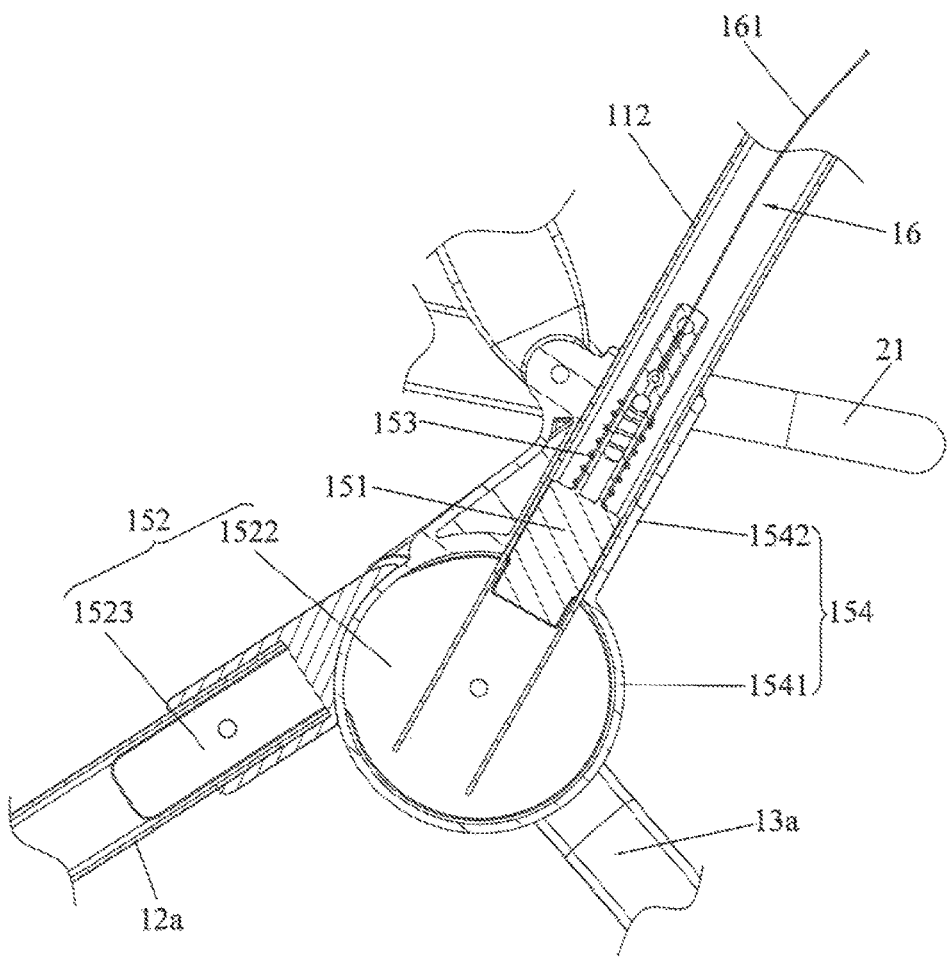
FIG. 7 is a cross-sectional view illustrating the pivot joint in a locked state.
Figure 8:
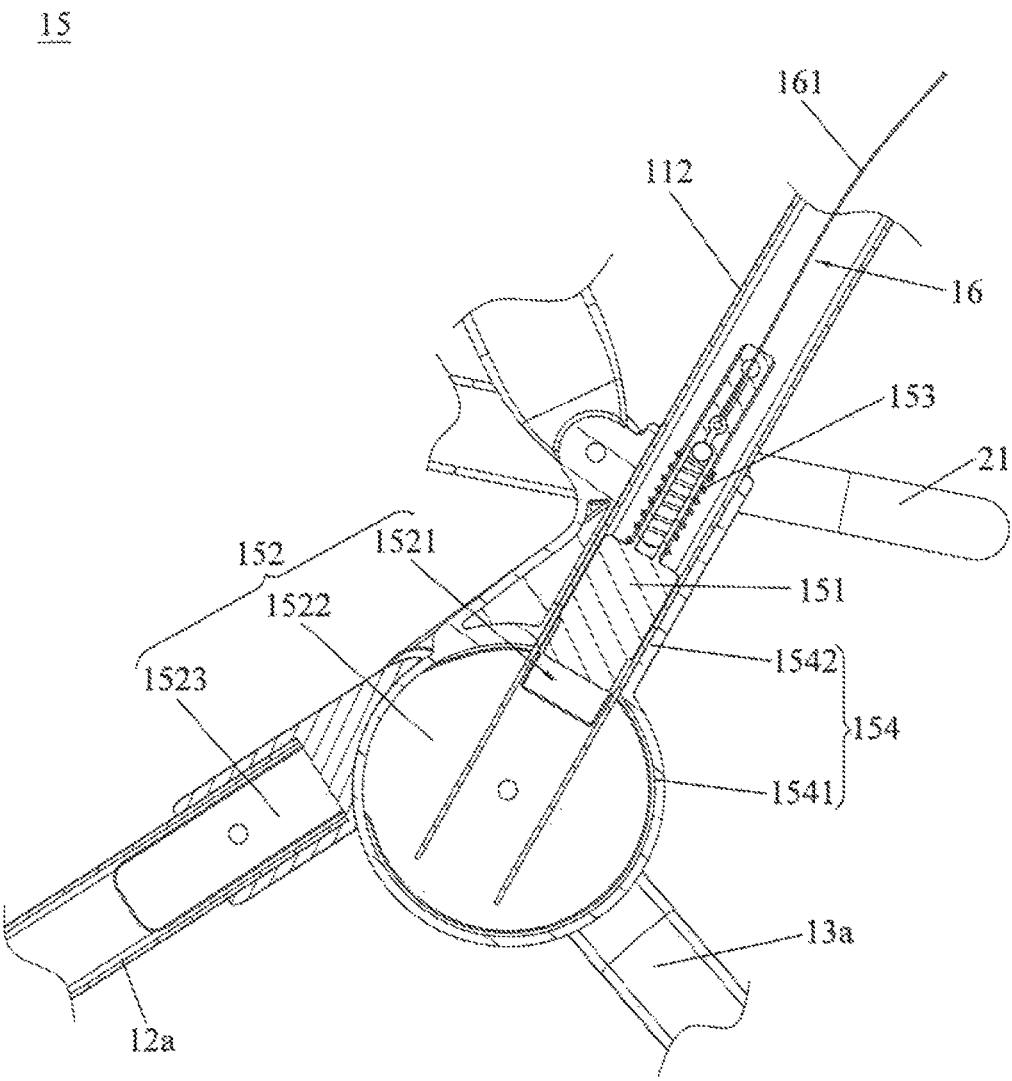
FIG. 8 is a cross-sectional view illustrating the pivot joint in an unlocked state.

In conjunction with FIG. 6, FIGS. 7 and 8 are schematic views respectively illustrating the pivot joint 15 in a locked and an unlocked state. The latch 151 can engage with the locking groove 1521 of the coupling member 152 so that the pivot joint 15 is locked as shown in FIG. 7 to prevent rotation of the handle frame 11 relative to the front leg frame 12, which thereby locks the stroller frame 10 in the deployed state. Moreover, the latch 151 can slide relative to the coupling members 152 and 154 to disengage from the locking groove 1521 as shown in FIG. 8, which unlocks the pivot joint 15 and allows rotation of the handle frame 11 relative to the front leg frame 12 for collapsing the stroller frame 10.

Referring again to FIGS. 5-8, the release mechanism 16 coupled with the latches 151 of the two pivot joints 15 can include two drawing members 161 respectively disposed inside the two side segments 112 of the handle frame 11. The drawing members 161 can be, for example, cables, wires and the like. Each drawing member 161 can have one end anchored with one corresponding latch 151, and another end anchored with the push handle 111 (e.g., near the end of the push handle 111). The push handle 111 can be thereby configured as a release actuator that is operable to cause an unlocking displacement of the latch 151 for switching the pivot joint 15 from the locked state to the unlocked state. When it is rotated downward toward the side segments 112, the push handle 111 serving as a release actuator can pull the two drawing members 161 in movement, which in turn can pull the two latches 151 to slide for respectively disengaging from the coupling members 152 and thereby unlocking the two pivot joints 15. Accordingly, folding of the handle frame 11 can concurrently unlock the two pivot joints 15 for allowing collapse of the entire stroller frame 10.

Figure 9:
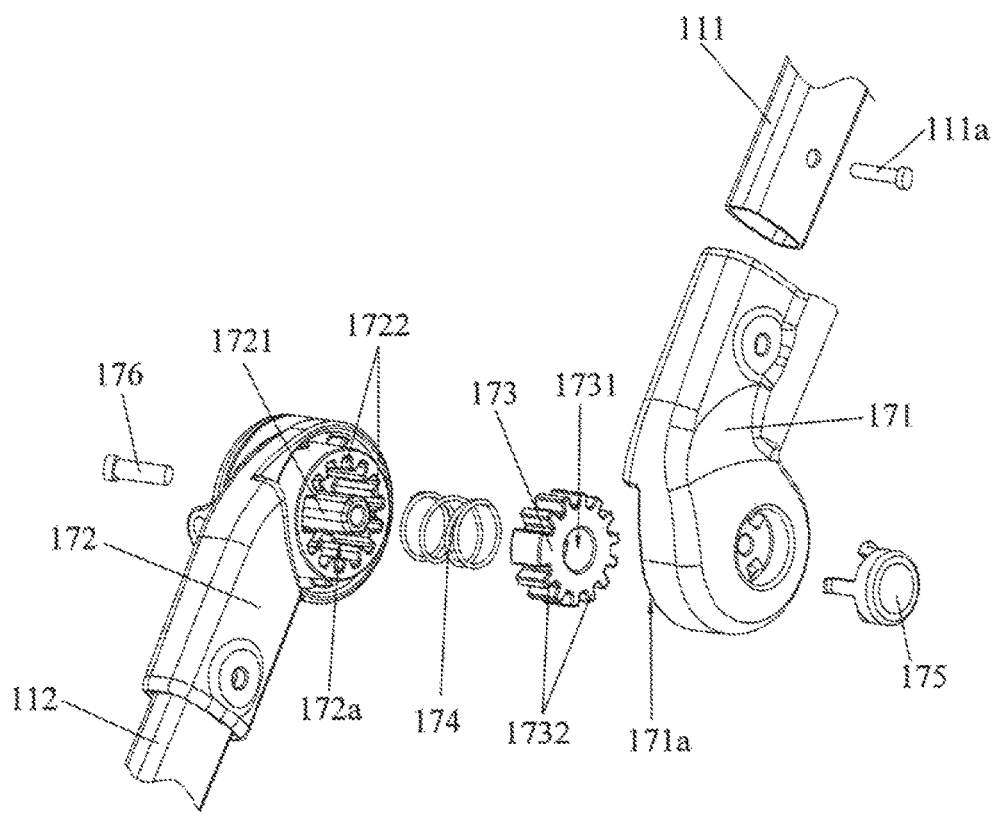
FIG. 9 is an exploded view illustrating the construction of another pivot joint that pivotally connects a push handle with a side segment in the infant stroller apparatus shown in FIG. 1.

The two pivot joints 17 pivotally connecting the push handle 111 with the two side segments 112 can have a similar construction. Referring to FIG. 9, the pivot joint 17 can include two coupling members 171 and 172, a latch 173, a spring 174 and a release button 175. The coupling member 171 is fixedly connected with one end of the push handle 111, and has an inner cavity 171a. For assembling the coupling member 171 with the push handle 111, the end of the push handle 111 can be exemplary inserted in an interior of the coupling member 171 and fastened thereto with a fastener 111a (e.g., a rivet). The other coupling member 172 is fixedly connected with one corresponding upper end of the side segment 112, and has an inner cavity 172a in which is fixedly connected a protruding shaft portion 1721. The attachment of the coupling member 172 with the side segment 112 may be similar to that implemented for fastening the coupling member 171 with the push handle 111. The coupling members 171 and 172 are pivotally connected with each other about the shaft portion 1721, which defines the pivot axis about which the push handle 111 can rotate relative to the two side segments 112. A fastener 176 may be disposed through an interior of the shaft portion 1721 and the coupling member 171 to hold the two coupling members 171 and 172 together.

The latch 173 has a central hole 1731, and is disposed such that the shaft portion 1721 passes through the central hole 1731. The latch 173 is thereby assembled for sliding displacement along the pivot axis of the pivot joint 17 defined by the shaft portion 1721, and can move in the inner cavities 171a and 172a of the two coupling members 171 and 172. A circumference of the latch 173 can have a plurality of teeth 1732. The inner cavity 172a of the coupling member 172 can have an inner sidewall provided with a plurality of grooves 1722 for engagement of the teeth 1732 of the latch 173, and the inner cavity 171a of the coupling member 171 can have an inner sidewall provided with a plurality of locking grooves (not shown) similar to the grooves 1722 for engagement of the teeth 1732 of the latch 173. The latch 173 is movable between an locking position where it respectively engages with the teeth of the two coupling members 171 and 172 and thereby blocks rotation of the push handle 111 relative to the side segments 112, and an unlocking position where the latch 173 is disengaged from the teeth of the coupling member 171 to allow rotation of the push handle 111 relative to the side segments 112.

The spring 174 is disposed between the latch 173 and an inner surface of the coupling member 172. The spring 174 can bias the latch 173 to its locking position as described previously.

The release button 175 is assembled with the coupling member 171, and can contact with the latch 173. The release button 175 can be depressed to urge the latch 173 to slide along the shaft portion 1721 from its locking position to its unlocking position, which compresses the spring 174 and unlocks the pivot joint 17 for allowing rotation of the push handle 111 relative to the two side segments 112.

In the illustrated embodiment, the release button 175 is exposed on the pivot joint 17 at an inner side of the handle frame 11 (i.e., facing a central region of the stroller frame 10) for operation. However, it will be appreciated that the release button 175 may also be disposed so as to be exposed on the pivot joint 17 at an outer side of the handle frame 11. For example, the release button 175 exposed on the outer side may be assembled with the coupling member 172, and the spring 174 may be assembled between the latch 173 and an inner surface of the coupling member 171.

Figure 10:
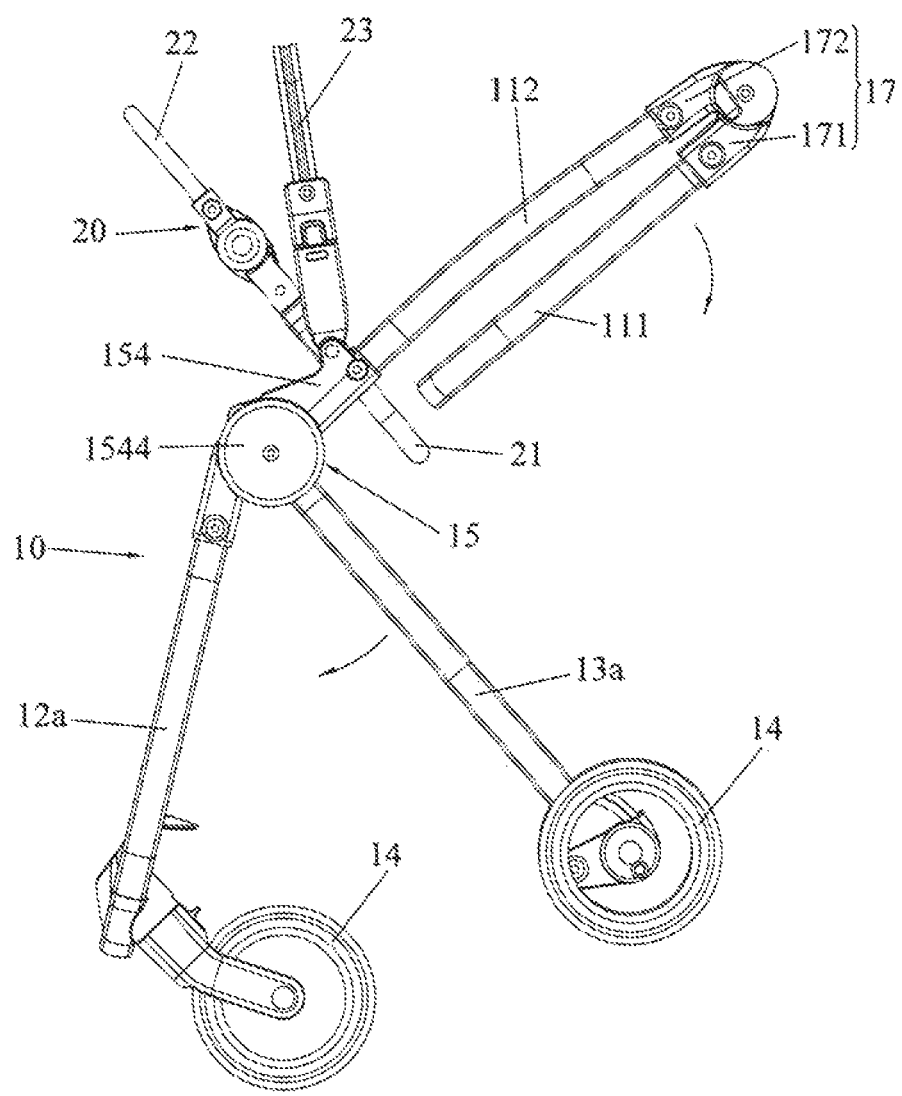
FIG. 10 is a schematic view illustrating the infant stroller apparatus shown in FIG. 1 in an intermediate stage of a folding operation.

The two pivot joints 17 provided with a latch mechanism as described previously can lock the handle frame 11 in the unfolded state as shown in FIG. 3 and in the folded state as shown in FIG. 10. Upon actuation of the release buttons 175, the pivot joints 17 can unlock to allow rotation of the push handle 111 relative to the side segments 112 between the folding and unfolding states.

Exemplary folding operation of the infant stroller apparatus 1 is described hereinafter with reference to FIGS. 5-11. While the stroller apparatus 1 is in the deployed state shown in FIG. 5, the latch 173 in each pivot joint 17 can respectively engage with the two coupling members 171 and 172 as described previously for locking the handle frame 11 in the unfolded state. Moreover, the latch 151 in each pivot joint 15 can be in the locking position for locking the handle frame 11, the front leg frame 12 and the rear leg frame 13 in the deployed state. The rear transversal portion 21a of the seat frame 20 can be located away behind the pivot joints 15 while the infant stroller apparatus 1 is in the deployed state.

For collapsing the stroller apparatus 1, a caregiver first depresses the release button 175 on each pivot joint 17 so that the latch 173 thereof is moved to its unlocking position, which unlocks the pivot joint 17. The unlocked push handle 111 is then rotated downward relative to the side segments 112 for folding the handle frame 11. When the handle frame 11 is in the folded state, the push handle 111 can be generally parallel to the side segments 112 as shown in FIG. 10. As it rotates for folding the handle frame 11, the push handle 111 pulls on the drawing members 161, which in turn pull the respective latches 151 upward to disengage from the locking grooves 1521 as shown in FIG. 8, thereby unlocking the pivot joints 15.

Figure 11:
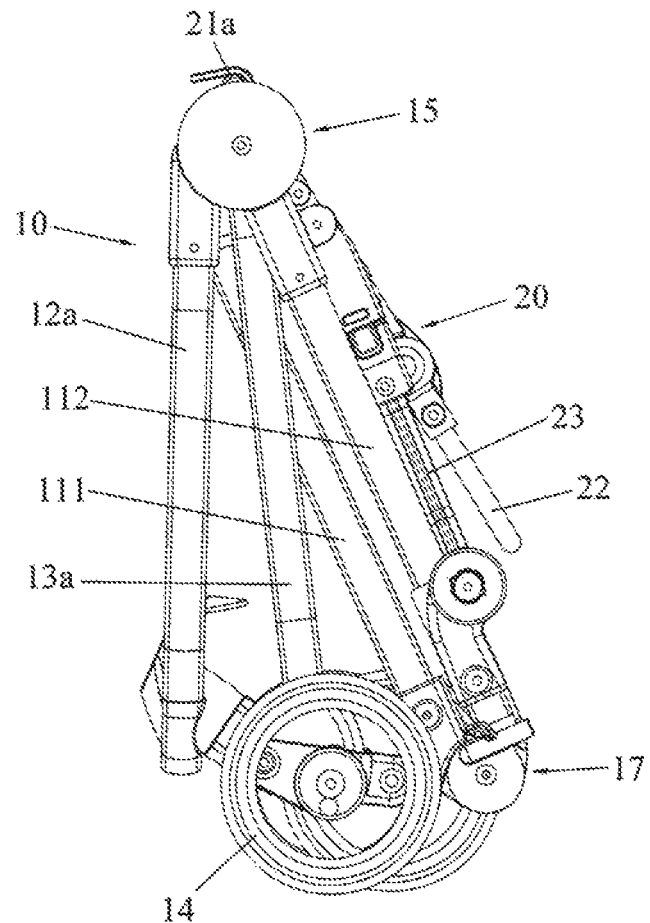
FIG. 11 is a schematic view illustrating the infant stroller apparatus shown in FIG. 1 in a collapsed state.
Figure 12:
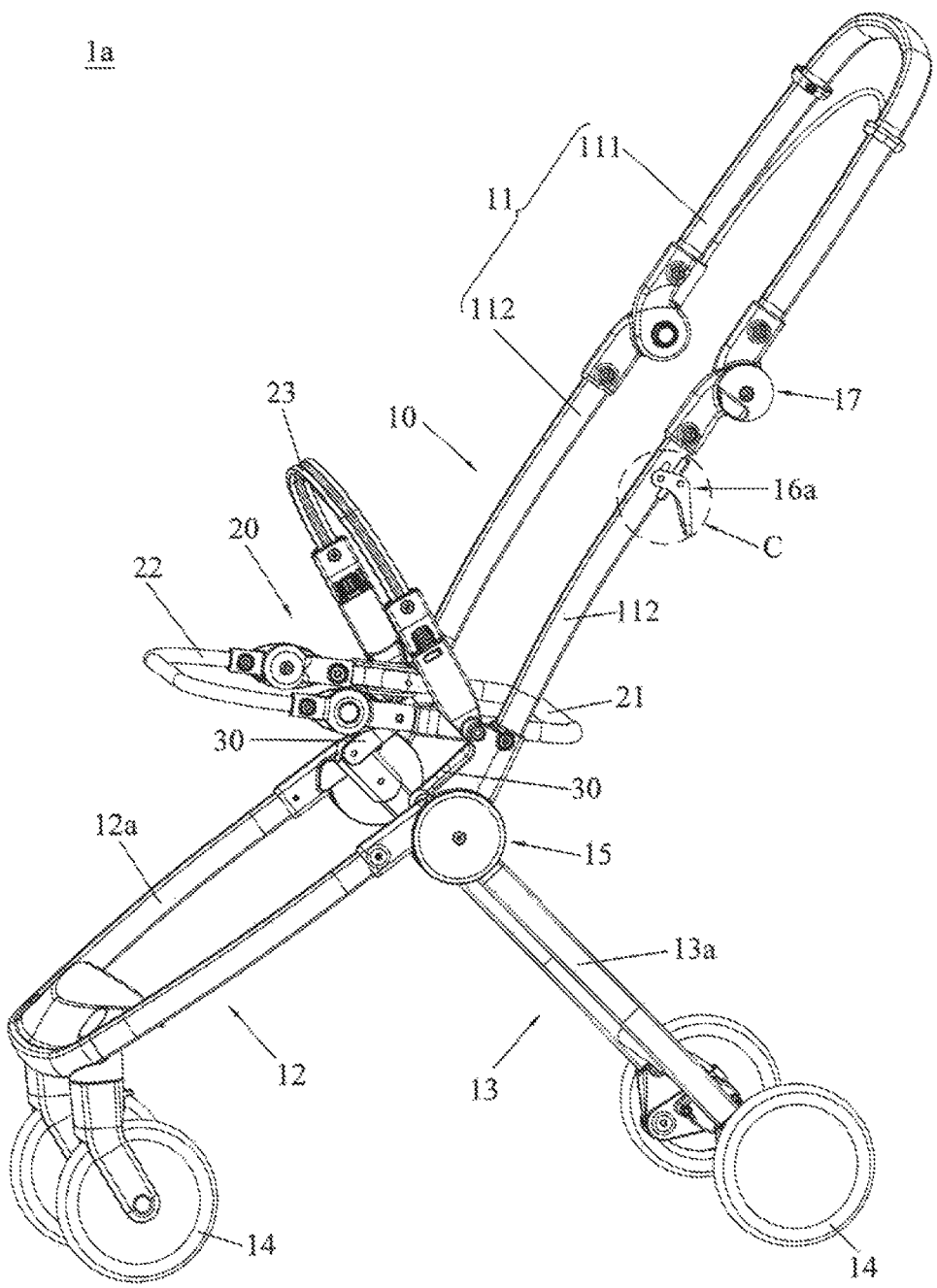
FIG. 12 is a schematic view illustrating another embodiment of an infant stroller apparatus.
Figure 13:
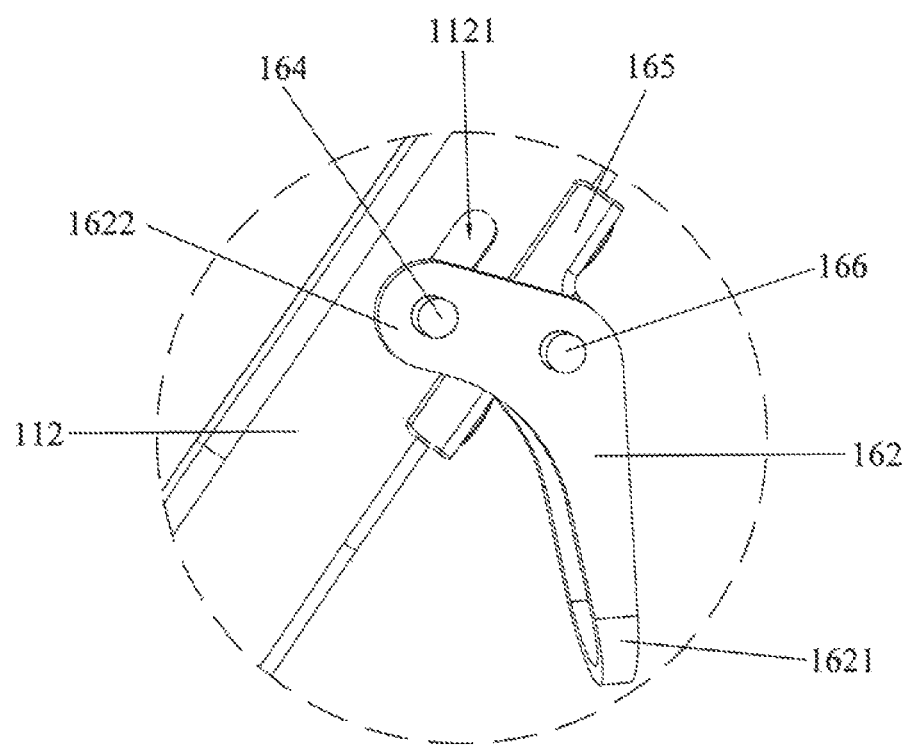
FIG. 13 is an enlarged view of portion C shown in FIG. 12.
Figure 14:
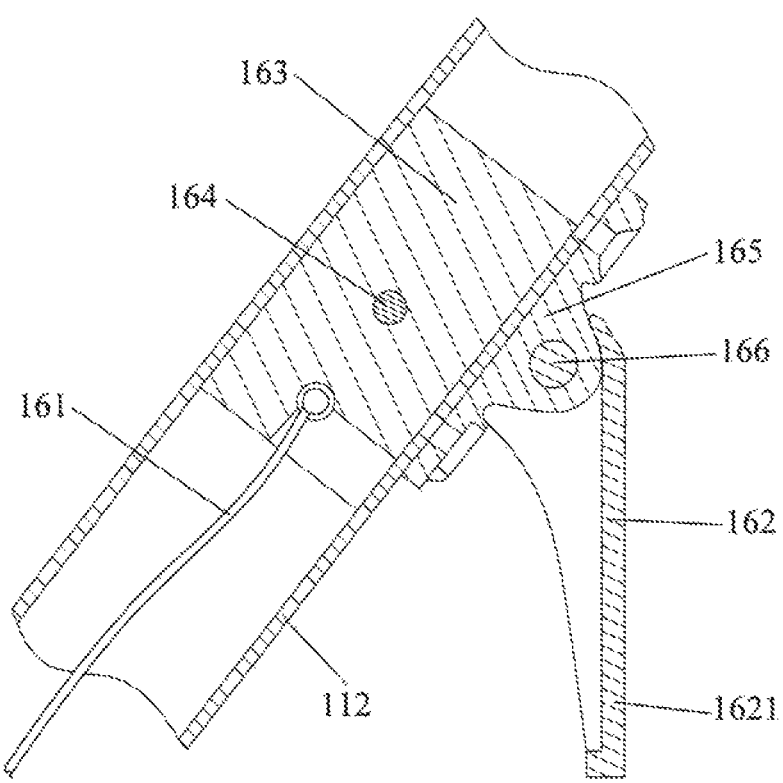
FIG. 14 is a cross-sectional view illustrating a release mechanism used in the infant stroller apparatus shown in FIG. 12.

After the pivot joints 15 are unlocked, the folded handle frame 11 can be rotated downward about the pivot joints 15 relative to the front leg frame 12. This downward rotation of the handle frame 11 displaces the stop abutment 113 (better shown in FIG. 4) away from the stop abutment 121 of the front leg frame 12 at each of the left and right side of the stroller frame 10, thereby releasing the upper ends of the side portions 13a of the rear leg frame 13. Moreover, this downward rotation of the handle frame 11 can cause a rotational displacement of the seat frame 20 relative to the handle frame 11 that urges rotation of the rear leg frame 13 about the pivot joints 15 toward the front leg frame 12 owing to the coupling of the linkages 30. As shown in FIG. 11, the stroller apparatus 1 can be thereby collapsed so that the handle frame 11 and the rear leg frame 13 are folded close to the front leg frame 12 and the pivot joints 17 positioned close to the wheels 14, the push handle 111 being located between the rear leg frame 13 and the side segments 112. While the stroller apparatus 1 is in the collapsed state, the frame portion 22 of the seat frame 20 and the guard member 23 are also positioned generally parallel and close to the side segments 112 of the handle frame 11. Accordingly, the collapsed stroller apparatus 1 can have a reduced volume with a height approximately equal to the height of the rear leg frame 13.

The stroller apparatus 1 described herein uses a structure in which a folding movement of the handle frame 11 can automatically trigger unlocking of the pivot joints 15 that connect the front leg frame 12 with the handle frame 11. The folding operation can be initiated with a simple manual operation for unlocking the pivot joints 17 of the handle frame 11, after which the stroller apparatus 1 can be easily collapsed by rotating the handle frame 11 without requiring further manual unlocking operation from the caregiver. Accordingly, the stroller apparatus 1 is very convenient to operate. When the stroller apparatus 1 is collapsed, the rear transversal portion 21a of the seat frame 20 is displaced to a position adjacent to the pivot joint 15, and thereby can be used as a handle which can be easily grasped by a caregiver to lift and transport the collapsed stroller apparatus 1.

The stroller apparatus 1 as described previously has a handle frame 11 that can be folded by rotating the pull handle 111 in one direction toward a rear of the side segments 112. It will be appreciated, however, that the handle frame 11 may also be folded by rotating the pull handle 111 toward a front of the side segments 112, after which the folded handle frame 11 can be rotationally collapsed toward the front leg frame 12 so that the push handle 111 is positioned between the side segments 112 and the front leg frame 12.

When the stroller apparatus 1 is to be deployed for use, the front leg frame 12 and the folded handle frame 11 are rotated away from each other about the pivot joints 15. Owing to the coupling of the linkages 15, this unfolding rotation also drives respective unfolding rotation of the seat frame 20 and the rear leg frame 13. Once the side segments 112, the front leg frame 12 and the rear leg frame 13 reach their respective deployed positions, the latch 151 biased by the spring 153 in each pivot joint 15 can engage with the corresponding locking groove 1521 as described previously, which lock the pivot joints 15 and block relative rotation between the side segments 112, the front leg frame 12 and the rear leg frame 13. Subsequently, the pivot joints 17 are unlocked by respectively depressing the release buttons 175, and the handle frame 11 then can be unfolded by rotating the push handle 111 upward relative to the side segments 112. Once the handle frame 11 reaches the unfolded state, the latch 173 biased by the spring 174 in each pivot joint 17 can recover its locking position to lock the pivot joints 17 and the handle frame 11 in the unfolded state.

FIGS. 12-15 are schematic views illustrating another embodiment of an infant stroller apparatus 1a. Compared to the embodiment described previously, the infant stroller apparatus 1a differs in the construction of two release mechanisms 16a that replace the aforementioned release mechanism 16, but otherwise is substantially similar to the infant stroller apparatus 1. The two release mechanisms 16a of the infant stroller apparatus 1a are respectively coupled with the two latches 151 (better shown in FIGS. 6-8) described previously, and are respectively assembled with the two side segments 112 of the handle frame 11 in a symmetric manner. The two release mechanisms 16a are similar in construction, each of which includes one drawing member 161, a release actuator 162 and a sliding member 163.

The release actuator 162 is pivotally connected with one corresponding side segment 112, e.g., at a location near the pivot joint 17. For example, a bracket 165 can be fixedly connected with an outer surface of the side segment 112, and the release actuator 162 can be pivotally assembled with the bracket 165 via a shaft portion 166. The release actuator 162 can have a bent shape including an outer portion 1621 located outside the side segment 112, and an inner portion 1622 located inside the side segment 112.

The sliding member 163 is assembled inside the side segment 112 for sliding displacement along a longitudinal axis of the side segment 112, and is movably connected with the inner portion 1622 of the release actuator 162. For example, a linking shaft 164 (e.g., a rivet) affixed with the inner portion 1622 of the sliding member 163, and can be guided for sliding movement along a guide slot 1121 provided in the side segment 112. Through the movable connection between the inner portion 1622 and the sliding member 163, rotation of the release actuator 162 can drive the sliding member 163 to slide up and down in the side segment 112.

Like previously described, the drawing member 161 can be a cable, wire and the like. The drawing member 161 has one end anchored with one corresponding latch 151, and another end anchored with the sliding member 163. When it slides upward driven by a rotation of the release actuator 162, the sliding member 163 can pull the drawing member 161 in movement, which in turn pulls the corresponding latch 151 to slide upward for disengaging from the coupling member 152 and thereby unlocking the pivot joint 15.

Exemplary operation of the two release mechanisms 16a is described hereinafter with reference to FIGS. 12-15. The release actuator 162 of each release mechanism 16a has a first position corresponding to a locked state of the pivot joint 15, and a second position corresponding to an unlocked state of the pivot joint 15. While the infant stroller apparatus 1a is deployed for use and the handle frame 11 is in the unfolded state, the release actuator 162 of each release mechanism 16a is in the first position.

Figure 15:
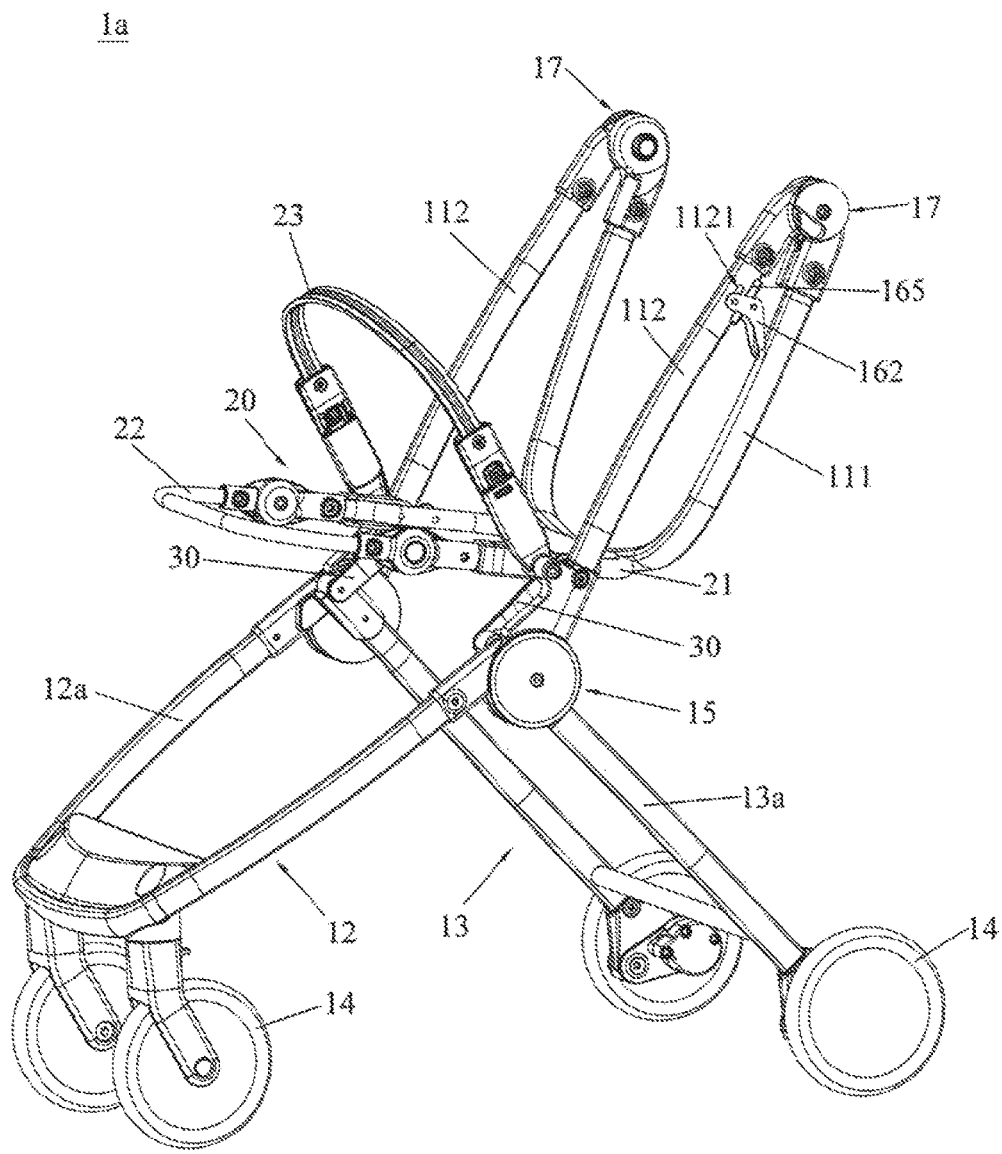
FIG. 15 is a schematic view illustrating the infant stroller apparatus of FIG. 12 with the handle frame in a folded state.
Figure 16:
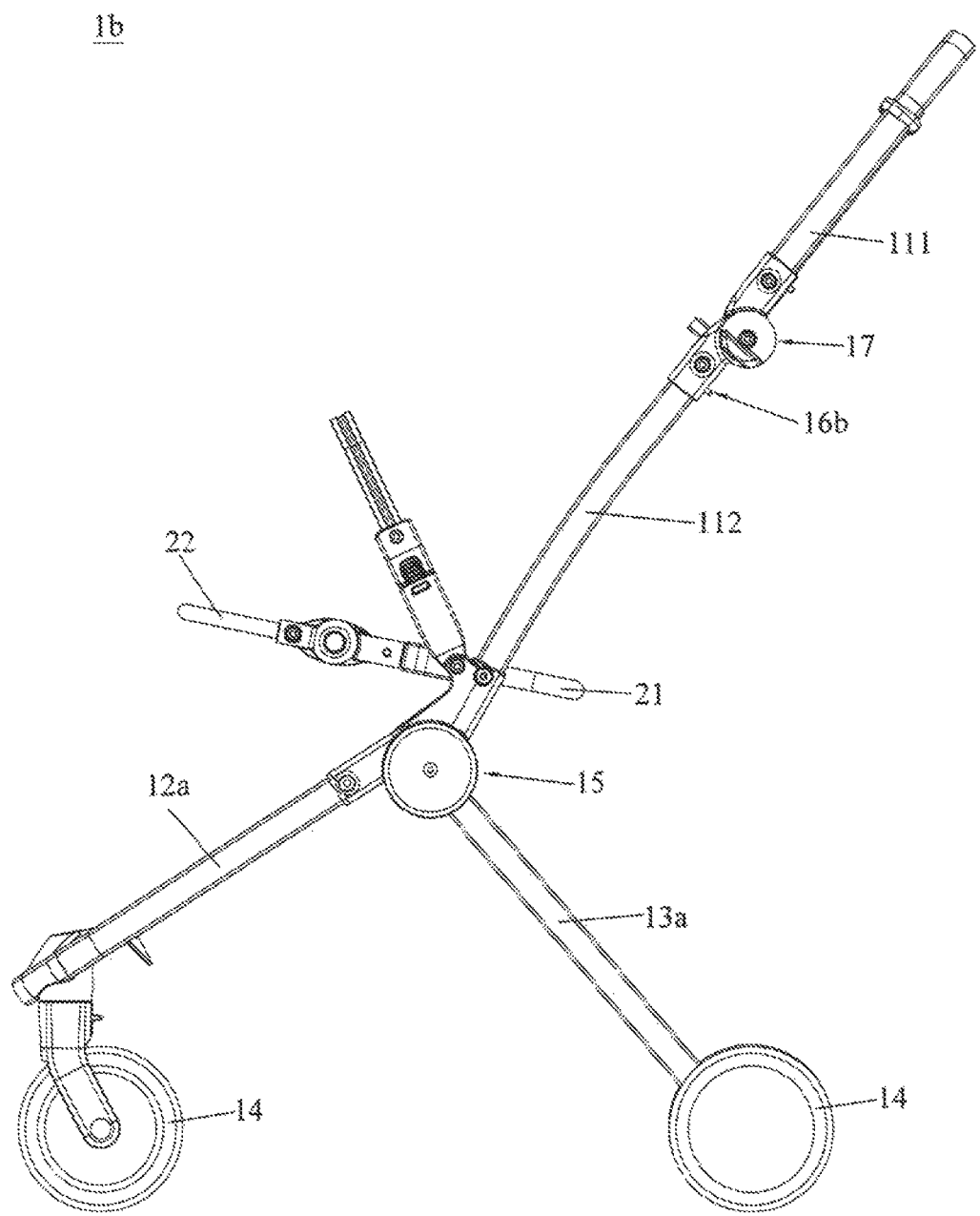
FIG. 16 is a schematic view illustrating another variant embodiment of an infant stroller apparatus.
Figure 17:
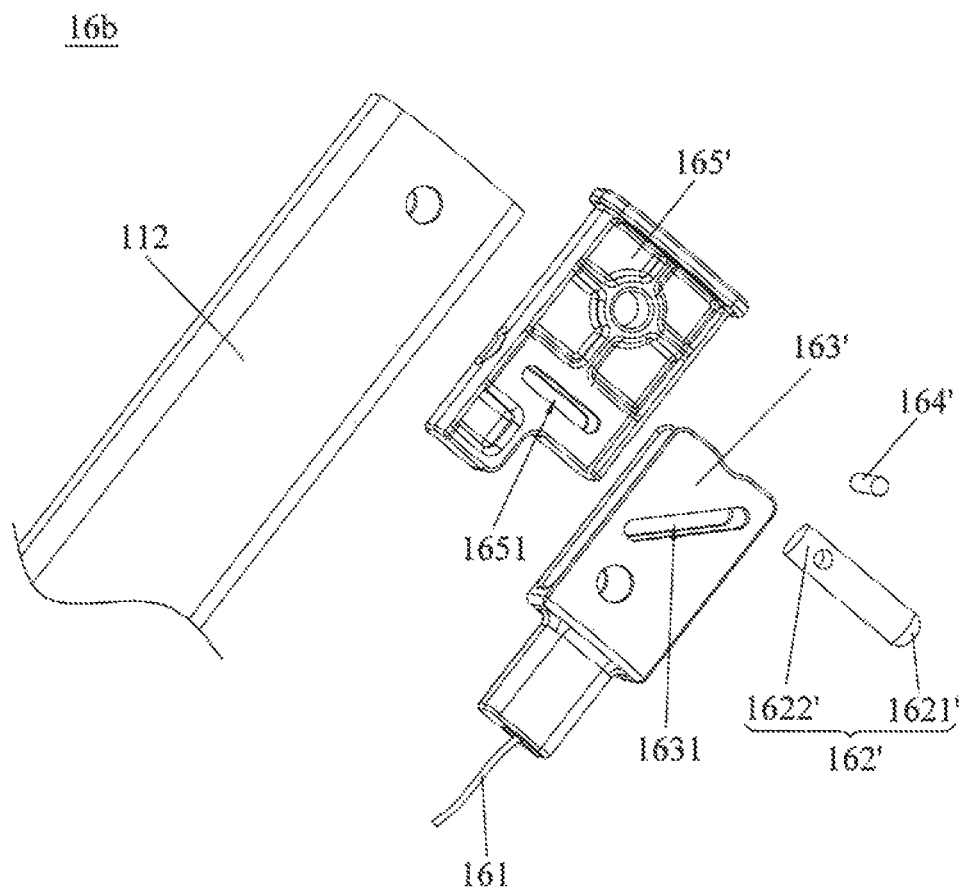
FIG. 17 is an exploded view illustrating the construction of a release mechanism used in the infant stroller apparatus shown in FIG. 16.
Figure 18:
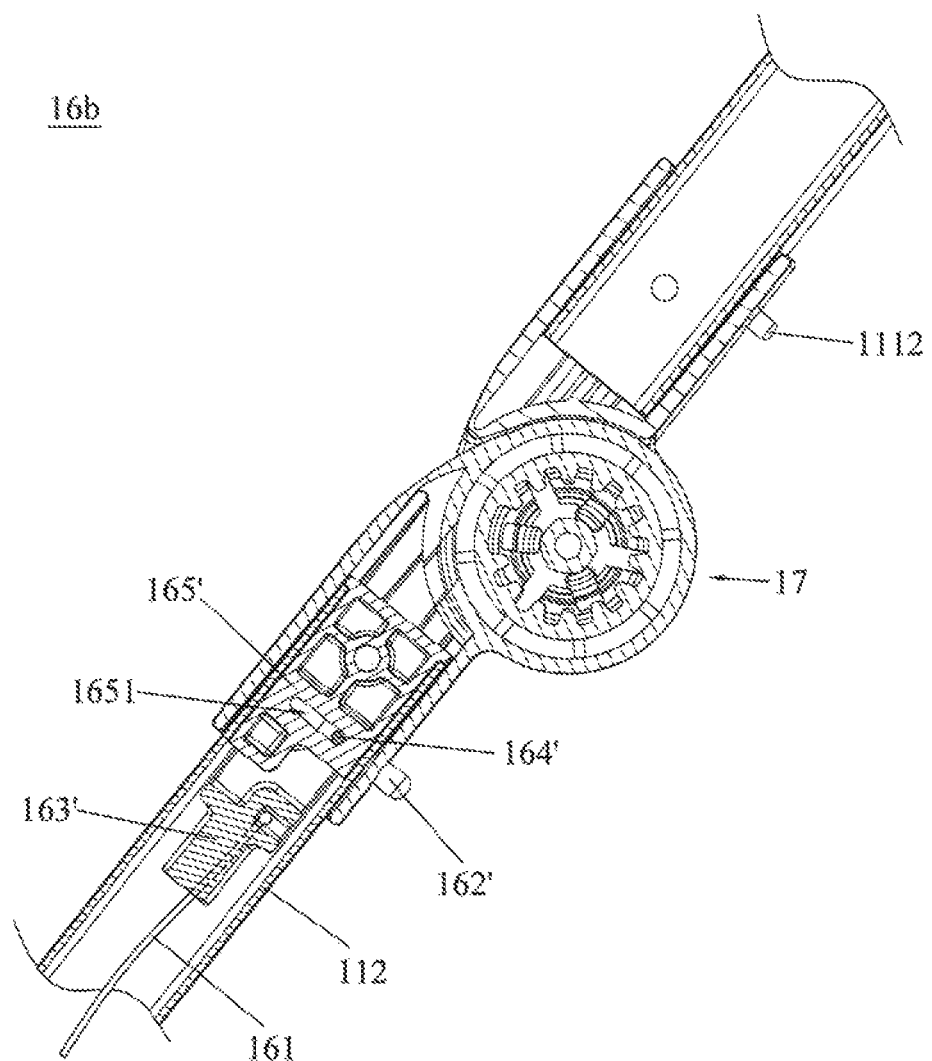
FIG. 18 is a cross-sectional view illustrating the release mechanism shown in FIG. 17.

For collapsing the infant stroller apparatus 1a, the pivot joints 17 are first unlocked by depressing the release buttons 175 as described previously. Then the push handle 111 is rotated toward the two side segments 112 for folding the handle frame 11. As it approaches the side segments 112, the push handle 111 can respectively contact and hit the outer portion 1621 of each release actuator 162 as shown in FIG. 15, which causes the release actuator 162 to rotate from the first position to the second position. This rotation of the two release actuators 162 drives the two sliding members 163 to slide upward relative to the side segments 112, which respectively pulls the latches 151 to slide upward via the coupling of the drawing members 161 for disengaging the latches 151 from the locking grooves 1521 (as shown in FIG. 8), thereby unlocking the pivot joints 15. After the pivot joints 15 are unlocked, the infant stroller apparatus 1a can be folded like previously described to a collapsed state, similar to the representation of FIG. 11.

FIGS. 16-19 are schematic views illustrating another embodiment of an infant stroller apparatus 1b. Compared to the embodiments described previously, the infant stroller apparatus 1b differs in the construction of two release mechanisms 16b that replace the aforementioned release mechanisms 16a, but otherwise is substantially similar to the infant stroller apparatuses 1 and 1a. The two release mechanisms 16b of the infant stroller apparatus 1b are respectively coupled with the two latches 151 (better shown in FIGS. 6-8) described previously, and are respectively assembled with the two side segments 112 of the handle frame 11 in a symmetric manner. The two release mechanisms 16b are similar in construction, each of which includes one drawing member 161, a release actuator 162' and a sliding member 163'.

The release actuator 162' is slidably connected with one corresponding side segment 112 (e.g., at a location near the pivot joint 17), and can extend outside the side segment 112. For example, a bracket 165' having a guide slot 1651 can be fixedly connected with the side segment 112, and an inner portion 1622' of the release actuator 162' can be fixedly connected with a shaft portion 164' that is guided for sliding displacement along the guide slot 1651 of the bracket 165'. In one embodiment, the guide slot 1651 is oriented so that the release actuator 162' can slide generally perpendicular to the side segment 112. Once it is assembled with the side segment 112, the release actuator 162' has an outer portion 1621' that can extend and expose outward.

The sliding member 163' is assembled inside the side segment 112 for sliding displacement along the longitudinal axis of the side segment 112, and is connected with the release actuator 162' via the shaft portion 164'. More specifically, the sliding member 163' can have a drive slot 1631 tilted an angle relative to the guide slot 1651, and the shaft portion 164' of the release actuator 162' can further be guided for sliding displacement along the drive slot 1631 which at least partially overlaps with the guide slot 1651. With this assembly, an inward displacement of the release actuator 162' toward an interior of the side segment 112 can drive the sliding member 163' to slide upward.

Like previously described, the drawing member 161 can be a cable, wire and the like. The drawing member 161 has one end anchored with one corresponding latch 151, and another end anchored with the sliding member 163'.

Exemplary operation of the two release mechanisms 16b is described hereinafter with reference to FIGS. 16-19. The release actuator 162' of each release mechanism 16b has a first position corresponding to a locked state of the corresponding pivot joint 15, and a second position corresponding to an unlocked state of the pivot joint 15. While the infant stroller apparatus 1b is deployed for use and the handle frame 11 is in the unfolded state, the release actuator 162' of each release mechanism 16b is in the first position.

Figure 19:
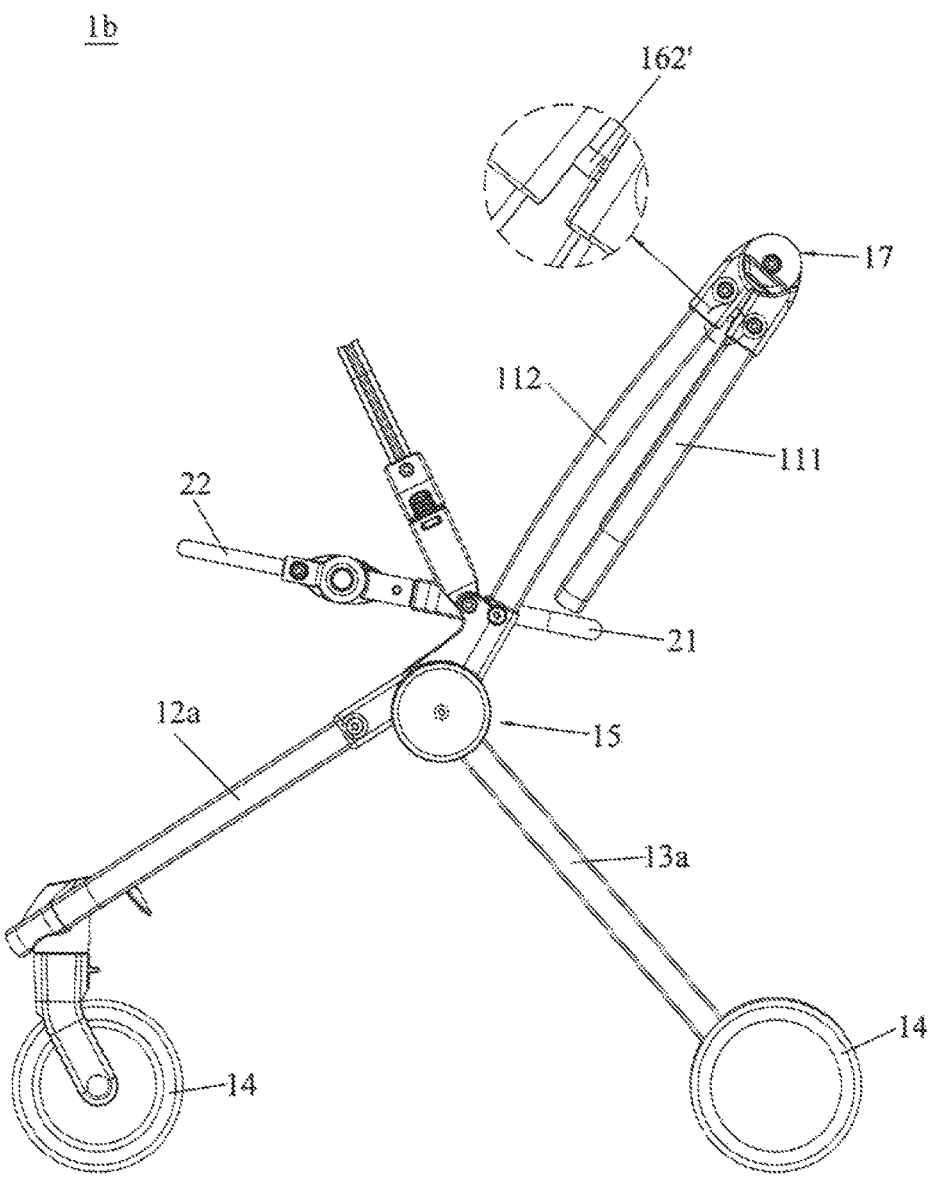
FIG. 19 is a schematic view illustrating the infant stroller apparatus of FIG. 16 with the handle frame in a folded state.

For collapsing the infant stroller apparatus 1b, the pivot joints 17 are first unlocked by depressing the release buttons 175 as described previously. Then the push handle 111 is rotated toward the two side segments 112 for folding the handle frame 11. As it approaches the side segments 112, the push handle 111 can respectively contact and hit the outer portion 1621' of each release actuator 162' as shown in FIG. 19, which causes the release actuator 162' to slide inward from the first position to the second position. For facilitating the actuation of the release actuators 162', the push handle 111 can have protruding knobs 1112 that can respectively contact and push the release actuators 162' inward. The inward displacements of the two release actuators 162' respectively drive the two sliding members 163' to slide upward relative to the side segments 112, which pull the latches 151 to slide upward via the coupling of the drawing members 161 for disengaging the latches 151 from the locking grooves 1521 (as shown in FIG. 8), thereby unlocking the pivot joints 15. After the pivot joints 15 are unlocked, the infant stroller apparatus 1b can be folded like previously described to the collapsed state.

Figure 20:
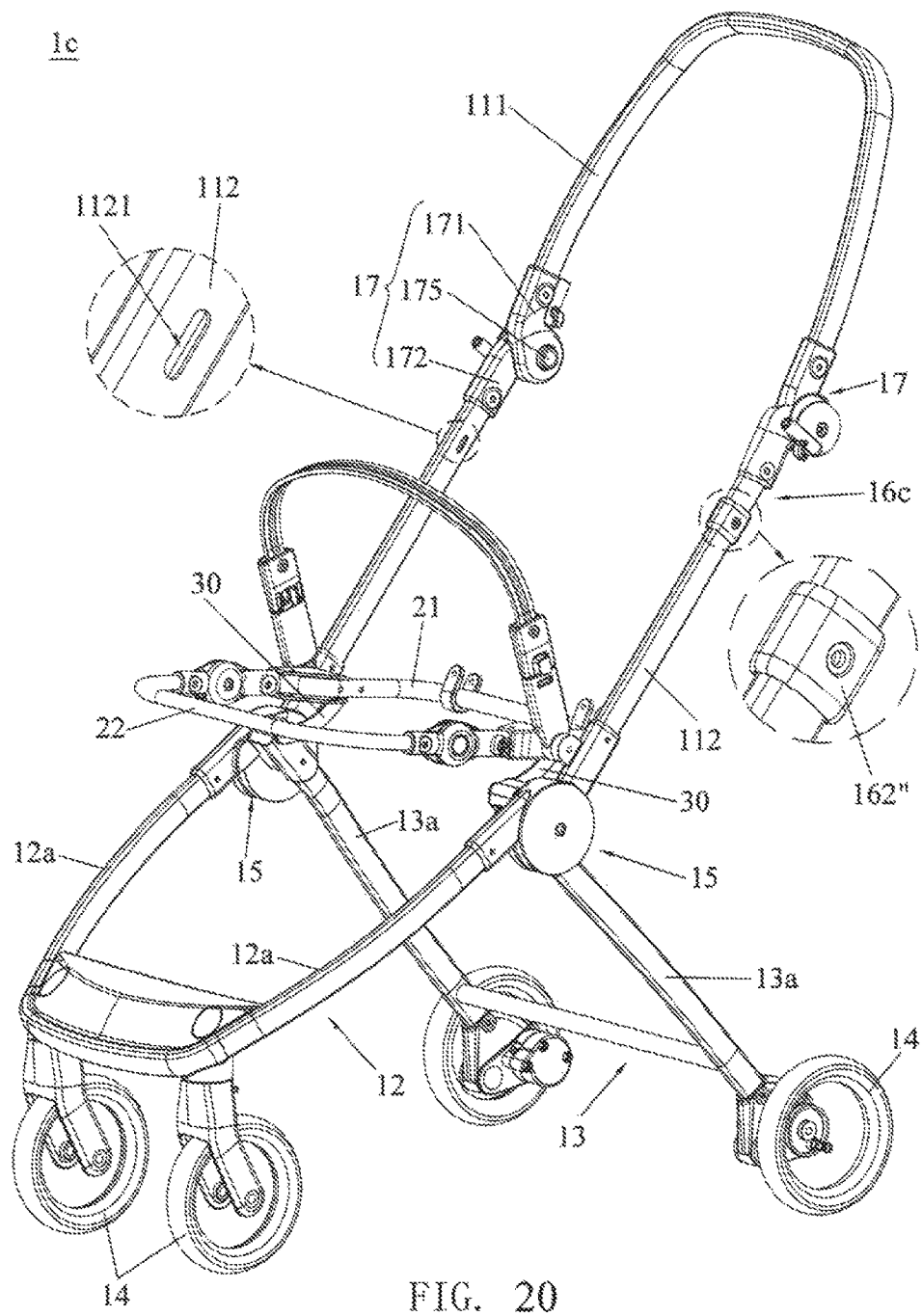
FIG. 20 is a schematic view illustrating another different embodiment of an infant stroller apparatus.
Figure 21:
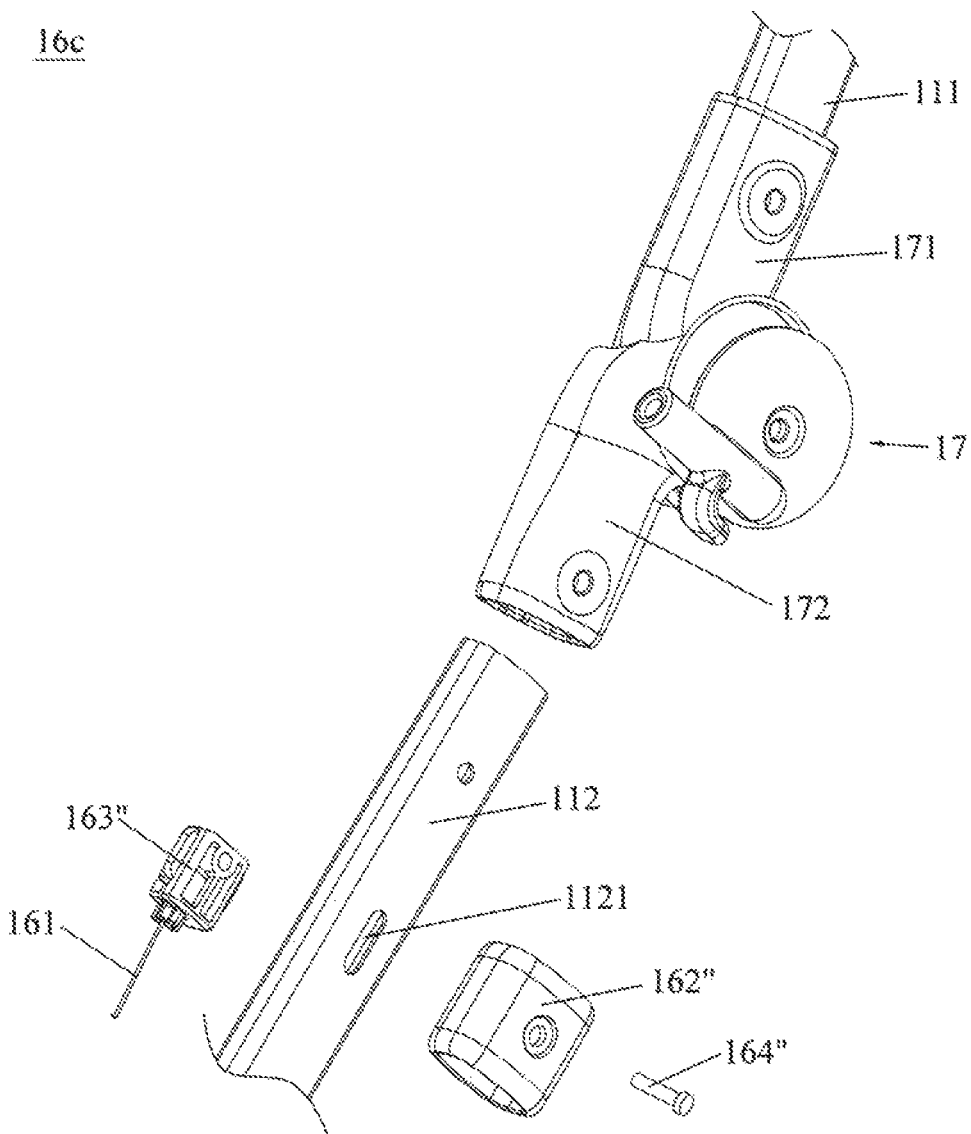
FIG. 21 is an exploded view illustrating the construction of a release mechanism used in the infant stroller apparatus shown in FIG. 20.

FIGS. 20 and 21 are schematic views illustrating another embodiment of an infant stroller apparatus 1c provided with two other release mechanisms 16c that replace the aforementioned release mechanisms. The two release mechanisms 16c of the infant stroller apparatus 1b are respectively coupled with the two latches 151 (better shown in FIGS. 6-8) described previously, and are respectively assembled with the two side segments 112 of the handle frame 11 in a symmetric manner. The two release mechanisms 16c are similar in construction, each of which includes one drawing member 161, a release actuator 162" and a sliding member 163".

The release actuator 162" is slidably connected with one corresponding side segment 112 (e.g., at a location near the pivot joint 17), and is exposed on the side segment 112 for operation. The sliding member 163" is assembled inside the side segment 112 for sliding displacement along the longitudinal axis of the side segment 112, and is fixedly connected with the release actuator 162" via a fastener 164" (e.g., a rivet). In some embodiment, the fastener 164" may further be guided for sliding movement along a guide slot 1121 provided in the side segment 112, which can facilitate positioning of the release actuator 162" on the side segment 112 and assist in guiding its sliding displacement. Like previously described, the drawing member 161 can be a cable, wire and the like. The drawing member 161 has one end anchored with one corresponding latch 151, and another end anchored with the sliding member 163".

The release actuator 162" of each release mechanism 16c is movable between a first position corresponding to a locked state of the corresponding pivot joint 15, and a second position corresponding to an unlocked state of the pivot joint 15. While the infant stroller apparatus 1c is deployed for use and the handle frame 11 is in the unfolded state, the release actuator 162" of each release mechanism 16c is in the first position.

For collapsing the infant stroller apparatus 1c, the pivot joints 17 are first unlocked by depressing the release buttons 175 as described previously. Then the push handle 111 is rotated toward the two side segments 112 for folding the handle frame 11. Once the handle frame 11 is folded as shown in FIG. 10, the release actuator 162" of each release mechanism 16c can be moved upward along the side segment 112. This operation respectively drives the two sliding members 163' to slide upward relative to the side segments 112, which pull the latches 151 to slide upward via the coupling of the drawing members 161 for disengaging from the locking grooves 1521 (as shown in FIG. 8), thereby unlocking the pivot joints 15. After the pivot joints 15 are unlocked, the infant stroller apparatus 1c can be folded like previously described to the collapsed state as shown in FIG. 11.

Advantages of the structures described herein include an assembly of a stroller frame and a seat frame that allows collapse of an infant stroller apparatus into a compact size. In particular, the stroller frame includes a handle frame that can be folded to further reduce the size of the collapsed infant stroller apparatus.

Realizations of the infant stroller apparatus have been described in the context of particular embodiments. These embodiments are meant to be illustrative and not limiting. Many variations, modifications, additions, and improvements are possible. These and other variations, modifications, additions, and improvements may fall within the scope of the inventions as defined in the claims that follow.

What is claimed is:

1. An infant stroller apparatus comprising:
    a front leg frame having a first side portion, the first side portion being fixedly connected with a first stop abutment;
    a rear leg frame having a second side portion, the second side portion having a protrusion; and
    a handle frame having a side segment, the first and second side portions and the side segment being pivotally connected with one another about a common first pivot axis, and the side segment of the handle frame being fixedly connected with a second stop abutment;
    wherein the protrusion is restrictedly positioned between the first and second stop abutments when the infant stroller apparatus is in a deployed state, respective abuttal of the protrusion against the first and second stop abutments in the deployed state preventing rotation of the rear leg frame relative to the handle frame and the front leg frame.

2. The infant stroller apparatus according to claim 1, wherein the second stop abutment travels away from the first stop abutment and the protrusion of the second side portion when the handle frame is rotated in a collapsing direction toward the front leg frame.

3. The infant stroller apparatus according to claim 1, further comprising:
    a seat frame pivotally connected with the side segment of the handle frame about a second pivot axis; and
    a bar linkage having a first and a second end, the first end being pivotally connected with the second side portion of the rear leg frame about a third pivot axis, and the second end being pivotally connected with the seat frame about a fourth pivot axis;
    wherein when the infant stroller apparatus is in the deployed state, the second pivot axis is above the first pivot axis, the third pivot axis is above the first pivot axis, and the fourth pivot axis is above and behind the first pivot axis.

4. The infant stroller apparatus according to claim 3, wherein when the infant stroller apparatus is in the deployed state, the second pivot axis is located in front of the fourth pivot axis and above and behind the first pivot axis.

5. The infant stroller apparatus according to claim 3, further including a guard member pivotally connected with the seat frame about the second pivot axis.

6. The infant stroller apparatus according to claim 3, wherein the seat frame has a rear transversal portion, and the first side portion of the front leg frame and the side segment of the handle frame are connected with each other via a pivot joint, the rear transversal portion of the seat frame being located behind the pivot joint when the infant stroller apparatus is in the deployed state, and the rear transversal portion of the seat frame being displaced to a position adjacent to the pivot joint when the infant stroller apparatus is folded from a deployed state to a collapsed state.

7. The infant stroller apparatus according to claim 3, wherein the seat frame includes a first and a second frame portion pivotally connected with each other, the first frame portion extending at a front of the seat frame, the second frame portion extending at a rear of the seat frame and further being respectively connected pivotally with the side segment of the handle frame and the second end of the bar linkage.

8. The infant stroller apparatus according to claim 1, wherein the first side portion of the front leg frame and the side segment of the handle frame are connected with each other via a pivot joint that includes a latch, the pivot joint thereby having a locked state preventing rotation of the handle frame relative to the front leg frame such that the infant stroller apparatus is locked in the deployed state, and the pivot joint further having an unlocked state allowing folding of the handle frame toward the front leg frame.

9. The infant stroller apparatus according to claim 8, wherein the handle frame has a foldable structure and includes a release actuator operatively connected with the latch of the pivot joint, the release actuator being operable to cause an unlocking displacement of the latch for switching the pivot joint from the locked state to the unlocked state.

10. The infant stroller apparatus according to claim 9, wherein the release actuator includes a push handle of the handle frame that is pivotally connected with the side segment via a second pivot joint and is connected with the latch via a drawing member, the release actuator when rotated toward the side segment pulls the drawing member and causes an unlocking displacement of the latch.

11. The infant stroller apparatus according to claim 10, wherein the second pivot joint includes a second latch operable to lock the handle frame in an unfolded state, and a release button exposed on the second pivot joint, the release button being operable to cause a displacement of the second latch to unlock the second pivot joint for rotation of the push handle relative to the side segment.

12. The infant stroller apparatus according to claim 9, wherein the handle frame further includes a push handle that is pivotally connected with the side segment via a second pivot joint, and the release actuator is assembled with the side segment at a location near the second pivot joint.

13. The infant stroller apparatus according to claim 12, wherein the push handle is rotatable relative to the side segment in a folding direction to hit the release actuator, thereby causing a movement of the release actuator that drives an unlocking displacement of the latch.

14. The infant stroller apparatus according to claim 13, wherein the release actuator is connected with a sliding member that is disposed inside the side segment, and the sliding member is connected with the latch via a drawing member, the release actuator when hit by the push handle rotates and drives a displacement of the sliding member that causes unlocking of the latch.

15. The infant stroller apparatus according to claim 13, wherein the release actuator is connected with a sliding member that is disposed inside the side segment, and the sliding member is connected with the latch via a drawing member, the release actuator when hit by the push handle slides and drives a displacement of the sliding member that causes unlocking of the latch.

16. The infant stroller apparatus according to claim 1, wherein the first stop abutment is provided on an inner side of the first side portion, and the second stop abutment is provided on an inner side of the side segment.

\* \* \* \* \*